US012507208B2

(12) United States Patent
Ryu et al.

(10) Patent No.: US 12,507,208 B2
(45) Date of Patent: Dec. 23, 2025

(54) RETRANSMISSION AND SELECTION OF HARQ AND MCS BASED ON PARTIAL SENSING

(71) Applicant: QUALCOMM Incorporated, San Diego, CA (US)

(72) Inventors: Jung Ho Ryu, Fort Lee, NJ (US); Sony Akkarakaran, Poway, CA (US); Gabi Sarkis, San Diego, CA (US); Tao Luo, San Diego, CA (US); Junyi Li, Fairless Hills, PA (US); Hua Wang, Basking Ridge, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 17/804,060

(22) Filed: May 25, 2022

(65) Prior Publication Data

US 2023/0388970 A1 Nov. 30, 2023

(51) Int. Cl.
*H04W 72/0446* (2023.01)
*H04L 1/00* (2006.01)
(Continued)

(52) U.S. Cl.
CPC ........... *H04W 72/02* (2013.01); *H04L 1/0004* (2013.01); *H04L 1/08* (2013.01); *H04L 1/1812* (2013.01);
(Continued)

(58) Field of Classification Search
CPC ............ H04W 72/02; H04W 72/0446; H04W 72/541; H04L 1/0004; H04L 1/08;
(Continued)

(56) References Cited

U.S. PATENT DOCUMENTS

2022/0078758 A1\* 3/2022 Lee ........................ H04W 72/02
2022/0264539 A1\* 8/2022 Dong ................. H04W 72/0453
(Continued)

OTHER PUBLICATIONS

International Search Report and Written Opinion—PCT/US2023/022872—ISA/EPO—Sep. 19, 2023.
(Continued)

*Primary Examiner* — Schquita D Goodwin
(74) *Attorney, Agent, or Firm* — Procopio, Cory, Hargreaves & Savitch LLP/QUALCOMM Incorporated

(57) ABSTRACT

This disclosure provides systems, devices, apparatus, and methods, including computer programs encoded on storage media, for retransmission and selection of HARQ and MCS based on partial sensing. A UE may perform a partial sensing procedure to identify one or more available resources for a sidelink transmission of the UE and transmit the sidelink transmission on a resource selected from the one or more available resources. The sidelink transmission may include at least one of a HARQ retransmission parameter or an MCS selected for the sidelink transmission based on at least one of a number of candidate slots for the partial sensing procedure, a quantity of the one or more available resources within the number of candidate slots, or a number of times that a threshold for a minimum amount of the one or more available resources is increased.

29 Claims, 17 Drawing Sheets

(51) Int. Cl.
*H04L 1/08* (2006.01)
*H04L 1/1812* (2023.01)
*H04W 72/02* (2009.01)
*H04W 72/25* (2023.01)
*H04W 72/541* (2023.01)

(52) U.S. Cl.
CPC ..... *H04W 72/0446* (2013.01); *H04W 72/541* (2023.01)

(58) Field of Classification Search
CPC . H04L 1/1812; H04L 27/0006; H04L 5/0037; H04L 5/0046; H04L 5/0055; H04L 5/0033
See application file for complete search history.

(56) References Cited

U.S. PATENT DOCUMENTS

| | | | | |
|---|---|---|---|---|
| 2022/0361108 A1* | 11/2022 | Zhou | .................... | H04W 72/02 |
| 2023/0080157 A1* | 3/2023 | Ko | .................... | H04W 74/0808 370/329 |
| 2023/0164825 A1* | 5/2023 | Deng | .................... | H04W 72/40 370/329 |
| 2024/0031999 A1* | 1/2024 | Yue | .................... | H04W 72/02 |
| 2024/0057064 A1* | 2/2024 | Shehata | ................ | H04W 72/02 |
| 2024/0172184 A1* | 5/2024 | Lin | .................... | H04W 72/02 |
| 2024/0276463 A1* | 8/2024 | Hwang | ................ | H04W 72/25 |
| 2025/0055580 A1* | 2/2025 | Ko | .................... | H04W 72/25 |
| 2025/0159695 A1* | 5/2025 | Zhao | .................... | H04W 72/232 |
| 2025/0185026 A1* | 6/2025 | Yao | .................... | H04W 76/14 |

OTHER PUBLICATIONS

3GPP: "3rd Generation Partnership Project, Technical Specification Group Radio Access Network, NR, Medium Access Control (MAC) Protocol Specification, (Release 17)", 3GPP TS 38.321, V17.0.0, Mar. 2022, 221 Pages, Section 5.22 (5.22.1-5.22.2.3), pp. 107-134.
3GPP: "3rd Generation Partnership Project, Technical Specification Group Radio Access Network, NR, Physical Layer Measurements (Release 17)", 3GPP TS 38.215, V17.1.0, Mar. 2022, 26 Pages, Sections 5.1.22-5.1.27, pp. 16-19.
3GPP: "3rd Generation Partnership Project, Technical Specification Group Radio Access Network, NR, Physical Layer Procedures for Data, (Release 17)", 3GPP TS 38.214, V17.1.0, Mar. 2022, 226 Pages, Section 8 (8.1-8.2.6), pp. 197-217.
3GPP: "3rd Generation Partnership Project, Technical Specification Group Radio Access Network, NR, Medium Access Control (MAC) protocol specification (Release 17)", 3GPP TS 38.321 V17.0.0, 650, Route Des Lucioles, F-06921 Sophia-Antipolis Cedex, France, Mar. 2022, pp. 1-221, sections 5.22, 5.22.1.1, section 5.22.1.1 Note 3A.
MCC Support: "Final Report of 3GPP TSG RAN WG1 #107-e v1.0.0 (Online meeting, Nov. 11-19, 2021)", 3GPP TSG RAN WG1 Meeting #107bis-e, R1-2200002, e-Meeting, Jan. 17-25, 2022, pp. 1-172, section 8.11.1.1.

* cited by examiner

RETRANSMISSION AND SELECTION OF HARQ AND MCS BASED ON PARTIAL SENSING

INTRODUCTION

The present disclosure relates generally to communication systems, and more particularly, to partial sensing techniques.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, an apparatus for wireless communication at a user equipment (UE) is provided. The apparatus includes a memory and at least one processor coupled to the memory and configured to perform a partial sensing procedure to identify one or more available resources for a sidelink transmission of the UE; and transmit the sidelink transmission on a resource selected from the one or more available resources, the sidelink transmission including at least one of a hybrid automatic repeat request (HARQ) retransmission parameter or a modulation and coding scheme (MCS) selected for the sidelink transmission based on at least one of: a number of candidate slots for the partial sensing procedure, a quantity of the one or more available resources within the number of candidate slots, or a number of times that a threshold for a minimum amount of the one or more available resources is increased.

In another aspect of the disclosure, a method of wireless communication at a UE is provided. The method includes performing a partial sensing procedure to identify one or more available resources for a sidelink transmission of the UE; and transmitting the sidelink transmission on a resource selected from the one or more available resources, the sidelink transmission including at least one of a HARQ retransmission parameter or an MCS selected for the sidelink transmission based on at least one of: a number of candidate slots, a quantity of the one or more available resources within the number of candidate slots for the partial sensing procedure, or a number of times that a threshold for a minimum amount of the one or more available resources is increased.

In another aspect of the disclosure, an apparatus for wireless communication at a UE is provided. The apparatus includes means for performing a partial sensing procedure to identify one or more available resources for a sidelink transmission of the UE; and means for transmitting the sidelink transmission on a resource selected from the one or more available resources, the sidelink transmission including at least one of a HARQ retransmission parameter or an MCS selected for the sidelink transmission based on at least one of: a number of candidate slots for the partial sensing procedure, a quantity of the one or more available resources within the number of candidate slots, or a number of times that a threshold for a minimum amount of the one or more available resources is increased.

In another aspect of the disclosure, a non-transitory computer-readable storage medium at a UE is provided. The non-transitory computer-readable storage medium is configured to perform a partial sensing procedure to identify one or more available resources for a sidelink transmission of the UE; and transmit the sidelink transmission on a resource selected from the one or more available resources, the sidelink transmission including at least one of a HARQ retransmission parameter or an MCS selected for the sidelink transmission based on at least one of: a number of candidate slots for the partial sensing procedure, a quantity of the one or more available resources within the number of candidate slots, or a number of times that a threshold for a minimum amount of the one or more available resources is increased.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
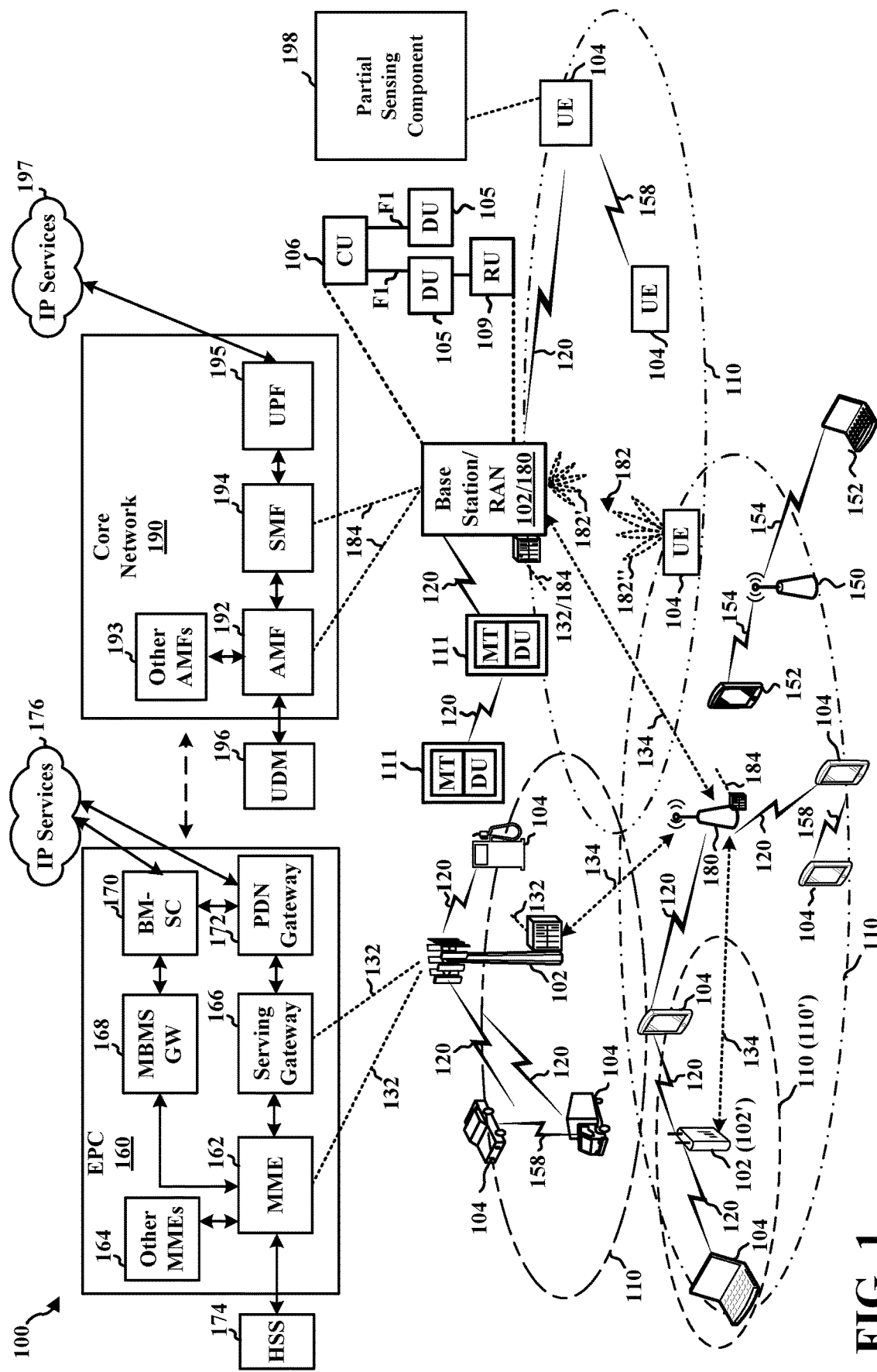
FIG. 1 is a diagram illustrating an example of a wireless communications system and an access network.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may transmit reservations of the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a physical sidelink shared channel (PSSCH) transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and resource blocks (RBs) that a particular UE has selected for a future transmission. The UE may exclude resources that are used and/or reserved by other UEs from a set of candidate available resources for sidelink transmission by the UE, and the UE may select/reserve resources for a sidelink transmission from the resources that are unused and therefore form the set of available resources. The UE may continuously perform sensing for SCI with resource reservations in order to maintain a set of candidate available resources from which the UE may select one or more resources for a sidelink transmission. Once the UE selects an available resource for transmission, the UE may transmit SCI indicating its own reservation of the selected resource for a sidelink transmission.

In some aspects, a UE may also perform a channel busy ratio (CBR) measurement to determine an activity level or "busy-ness" of a channel on which the UE performed the CBR measurement, e.g., in addition to the sensing. CBR refers to a percentage of sub-channels in a set of resources for wireless transmission, which may be referred to as a resource pool, having a received signal strength indicator (RSSI) that exceeds a configured/pre-configured threshold sensed over a CBR measurement window in time. The CBR measurement window may refer to period of time over which the CBR is measured. As an example, if the resource pool corresponds to a set of resources in frequency and time, the CBR may correspond to a percentage of the resources in the resource pool having an RSSI that exceeds the threshold during the period of time of the CBR measurement window. The UE may use the CBR measurement to select one or more parameters of wireless communication, such as a number of HARQ retransmissions, a number of sub-channels for a physical sidelink shared channel (PSSCH)/physical sidelink control channel (PSCCH) transmission in a slot, a modulation and coding scheme (MCS), a channel occupancy ratio (CR) threshold, etc.

In examples based on partial sensing, CBR measurement may be decreased based on a capability of the UE and/or power saving at the UE, and CBR measurement procedures may be limited to slots for which the UE performs an RSSI measurement rather than being performed in each slot. Partial sensing refers to a technique where the UE senses the channel in a non-continuous manner. Partial sensing may be in contrast to full sensing, where the UE may continuously sense the channel to monitor for resource reservations by other UEs. The UE may perform one of different types of partial sensing. While partial sensing may help to reduce power consumption at the UE, the UE may have partial measurements for CBR. Aspects presented herein enable the UE to save power through partial sensing while enabling the UE to select parameters such as a HARQ retransmission parameter, an MCS, etc. based on an indicator that reflects a channel activity level. Accordingly, the UE may determine to utilize indicators other than the CBR in association with partial sensing techniques as a measure of the channel activity level.

In some aspects, the UE may select the MCS and/or a number of hybrid automatic repeat (HARQ) retransmissions without a CBR measurement value based on a number of Y candidate slots selected for partial sensing, a quantity of available resources within the number of candidate slots, a number of times a reference signal received power (RSRP) threshold is adjusted based on a minimum amount of available resources for the sidelink transmission, etc. The UE may perform partial sensing based on selected Y candidate slots, and the candidate slots may refer to slots from which the UE may select resources to transmit a sidelink transmission. In a first example, the UE may increase the number of candidate slots to provide an increased set of available resources that the UE may use to transmit an increased number of HARQ retransmissions. Increasing the number of candidate slots increases the amount of sensing the UE has to perform and increases the amount of power expended by the UE for partial sensing. In a second example, the UE may determine that a lower amount/percentage of available resources in the number of candidate slots may correspond to a busier channel, as unavailable resources in the number of candidate slots may correspond to resources reserved by other UEs. In a third example, the UE may increase an RSRP threshold in increments. Increasing the RSRP threshold may lead to fewer candidate resources being removed from the candidate resources that are available for the sidelink transmission because candidate resources are removed from the set of resources considered to be available if a received resource reservation for the candidate resources has an RSRP above the threshold. If the RSRP threshold is higher, the RSRP associated with a resource reservation is less likely to exceed the threshold, and the corresponding reserved resources are less likely to be excluded from the set of candidate resources for a sidelink transmission. The UE may increment the RSRP threshold until the incremental increases to the RSRP threshold provides the number of available candidate resources that is greater than a threshold percentage. In some aspects, the RSRP may be incremented until the contiguous sub-channels in candidate slots of the available candidate resources meet a threshold. The UE may increase/increment the RSRP threshold more times to obtain the threshold quantity of candidate resources if the channel is busier than if the channel is less busy.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, may be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it may be understood that the term "sub-6 GHz" or the like if used herein may broadly represent frequencies that may be less than 6 GHz, may be within FR1, or may include mid-band frequencies. Further, unless specifically stated otherwise, it may be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a partial sensing component 198 configured to perform a partial sensing procedure to identify one or more available resources for a sidelink transmission; and transmit the sidelink transmission on a resource selected from the one or more available resources, the sidelink transmission including at least one of a HARQ retransmission parameter or an MCS selected for the sidelink transmission of the UE based on at least one of: a number of candidate slots, a quantity of the one or more available resources within the number of candidate slots, or a number of times that a threshold for a minimum amount of the one or more available resources is increased. Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 13:
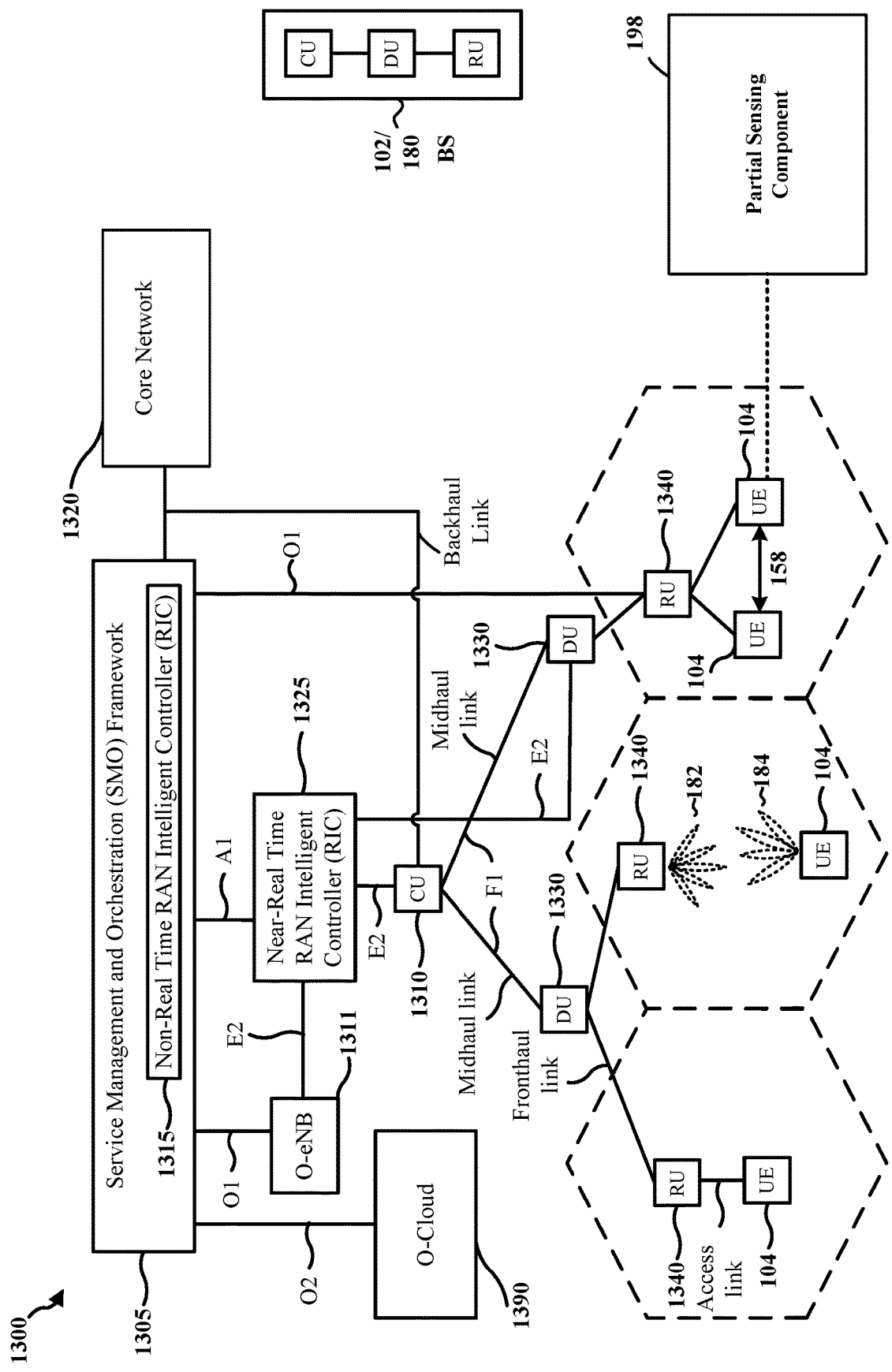
FIG. 13 is a diagram illustrating an example of a wireless communications system and an access network.

FIG. 13 shows a diagram illustrating an example disaggregated base station 1300 architecture. The disaggregated base station 1300 architecture may include one or more central units (CUs) 1310 that can communicate directly with a core network 1320 via a backhaul link, or indirectly with the core network 1320 through one or more disaggregated base station units (such as a Near-Real Time (Near-RT) RAN Intelligent Controller (RIC) 1325 via an E2 link, or a Non-Real Time (Non-RT) RIC 1315 associated with a Service Management and Orchestration (SMO) Framework 1305, or both). A CU 1310 may communicate with one or more distributed units (DUs) 1330 via respective midhaul links, such as an F1 interface. The DUs 1330 may communicate with one or more radio units (RUs) 1340 via respective fronthaul links. The RUs 1340 may communicate with respective UEs 104 via one or more radio frequency (RF) access links. In some implementations, the UE 104 may be simultaneously served by multiple RUs 1340.

Each of the units, i.e., the CUs 1310, the DUs 1330, the RUs 1340, as well as the Near-RT RICs 1325, the Non-RT RICs 1315 and the SMO Framework 1305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1310. The CU 1310 may be configured to handle user plane functionality (i.e., Central Unit-User Plane (CU-UP)), control plane functionality (i.e., Central Unit-Control Plane (CU-CP)), or a combination thereof. In some implementations, the CU 1310 can be logically split into one or more CU-UP units and one or more CU-CP units. The CU-UP unit can communicate bidirectionally with the CU-CP unit via an interface, such as the E1 interface when implemented in an O-RAN configuration. The CU 1310 can be implemented to communicate with the DU 1330 for network control and signaling.

The DU 1330 may correspond to a logical unit that includes one or more base station functions to control the operation of one or more RUs 1340. In some aspects, the DU 1330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1330 may further host one or more low PHY layers. Each layer (or module) can be implemented with an interface configured to communicate signals with other layers (and modules) hosted by the DU 1330, or with the control functions hosted by the CU 1310.

Lower-layer functionality can be implemented by one or more RUs 1340. In some deployments, an RU 1340, controlled by a DU 1330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1340 can be implemented to handle over the air (OTA) communication with one or more UEs 104. In some implementations, real-time and non-real-time aspects of control and user plane communication with the RU(s) 1340 can be controlled by the corresponding DU 1330. In some scenarios, this configuration can enable the DU(s) 1330 and the CU 1310 to be implemented in a cloud-based RAN architecture, such as a vRAN architecture.

The SMO Framework 1305 may be configured to support RAN deployment and provisioning of non-virtualized and virtualized network elements. For non-virtualized network elements, the SMO Framework 1305 may be configured to support the deployment of dedicated physical resources for RAN coverage requirements which may be managed via an operations and maintenance interface (such as an O1 interface). For virtualized network elements, the SMO Framework 1305 may be configured to interact with a cloud computing platform (such as an open cloud (O-Cloud) 1390) to perform network element life cycle management (such as to instantiate virtualized network elements) via a cloud computing platform interface (such as an O2 interface). Such virtualized network elements can include, but are not limited to, CUs 1310, DUs 1330, RUs 1340 and Near-RT RICs 1325. In some implementations, the SMO Framework 1305 can communicate with a hardware aspect of a 4G RAN, such as an open eNB (O-eNB) 1311, via an O1 interface. Additionally, in some implementations, the SMO Framework 1305 can communicate directly with one or more RUs 1340 via an O1 interface. The SMO Framework 1305 also may include a Non-RT RIC 1315 configured to support functionality of the SMO Framework 1305.

The Non-RT RIC 1315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1325. The Non-RT RIC 1315 may be coupled to or communicate with (such as via an A1 interface) the Near-RT RIC 1325. The Near-RT RIC 1325 may be configured to include a logical function that enables near-real-time control and optimization of RAN elements and resources via data collection and actions over an interface (such as via an E2 interface) connecting one or more CUs 1310, one or more DUs 1330, or both, as well as an O-eNB, with the Near-RT RIC 1325.

In some implementations, to generate AI/ML models to be deployed in the Near-RT RIC 1325, the Non-RT RIC 1315 may receive parameters or external enrichment information from external servers. Such information may be utilized by the Near-RT RIC 1325 and may be received at the SMO Framework 1305 or the Non-RT RIC 1315 from non-network data sources or from network functions. In some examples, the Non-RT RIC 1315 or the Near-RT RIC 1325 may be configured to tune RAN behavior or performance. For example, the Non-RT RIC 1315 may monitor long-term trends and patterns for performance and employ AI/ML models to perform corrective actions through the SMO Framework 1305 (such as reconfiguration via O1) or via creation of RAN management policies (such as A1 policies).

Figure 2:
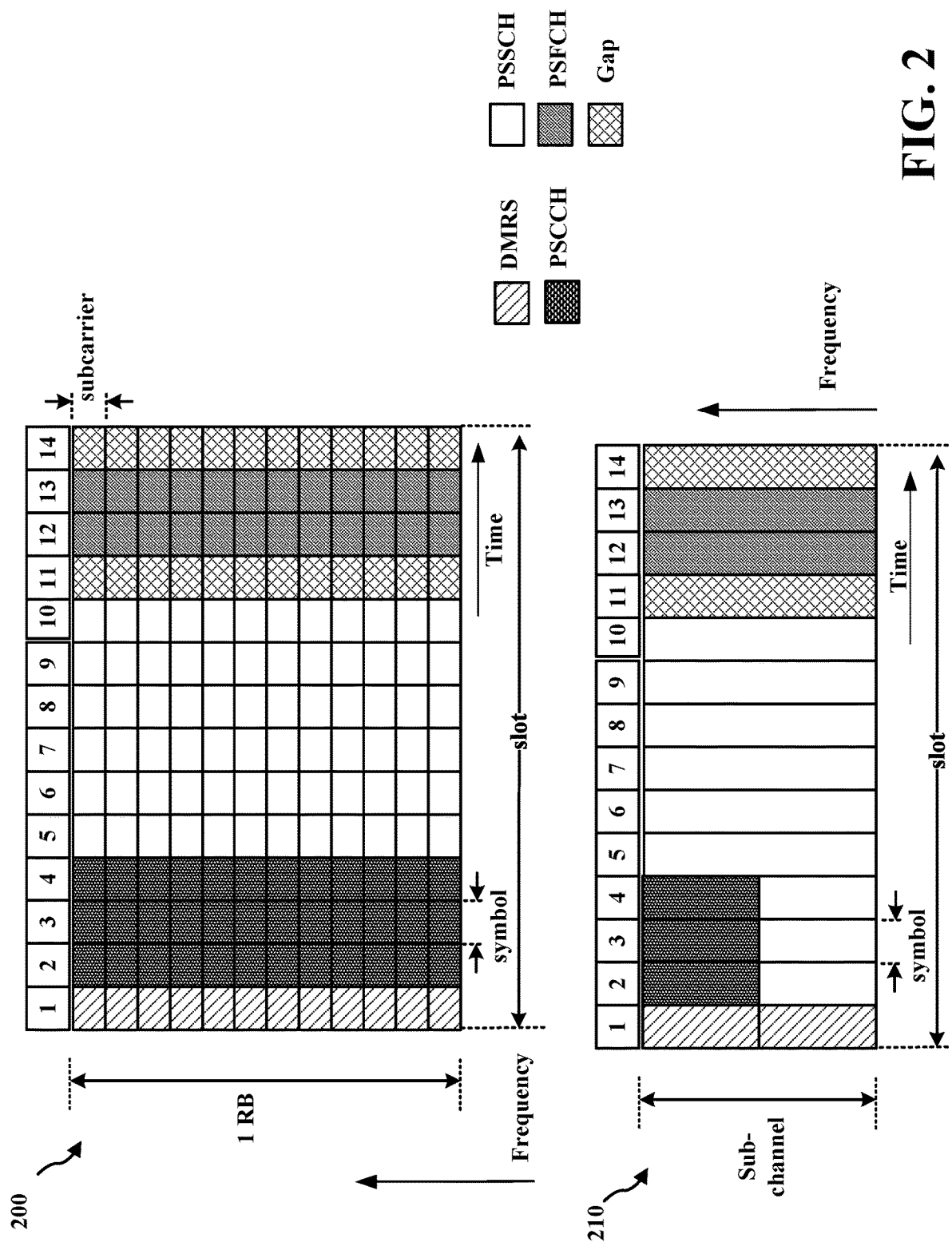
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
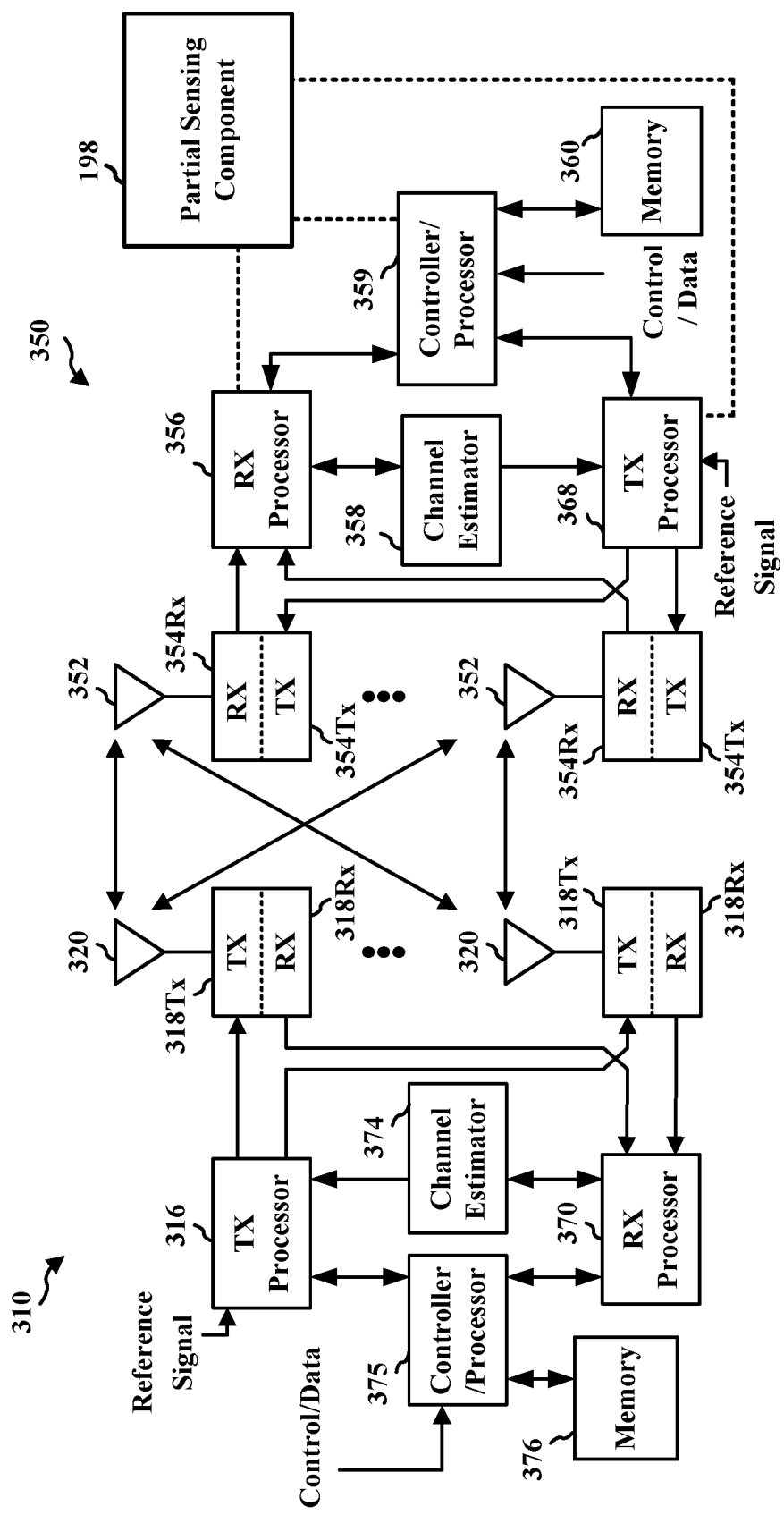
FIG. 3 is a diagram illustrating an example of a first device and a second device involved in wireless communication.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate an RF carrier with a respective spatial stream for transmission.

At the device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining a likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the partial sensing component 198 of FIG. 1. As the device 310 and the device 350 may each be a UE, in some aspects, both device 310 and device 350 may include the partial sensing component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 14:
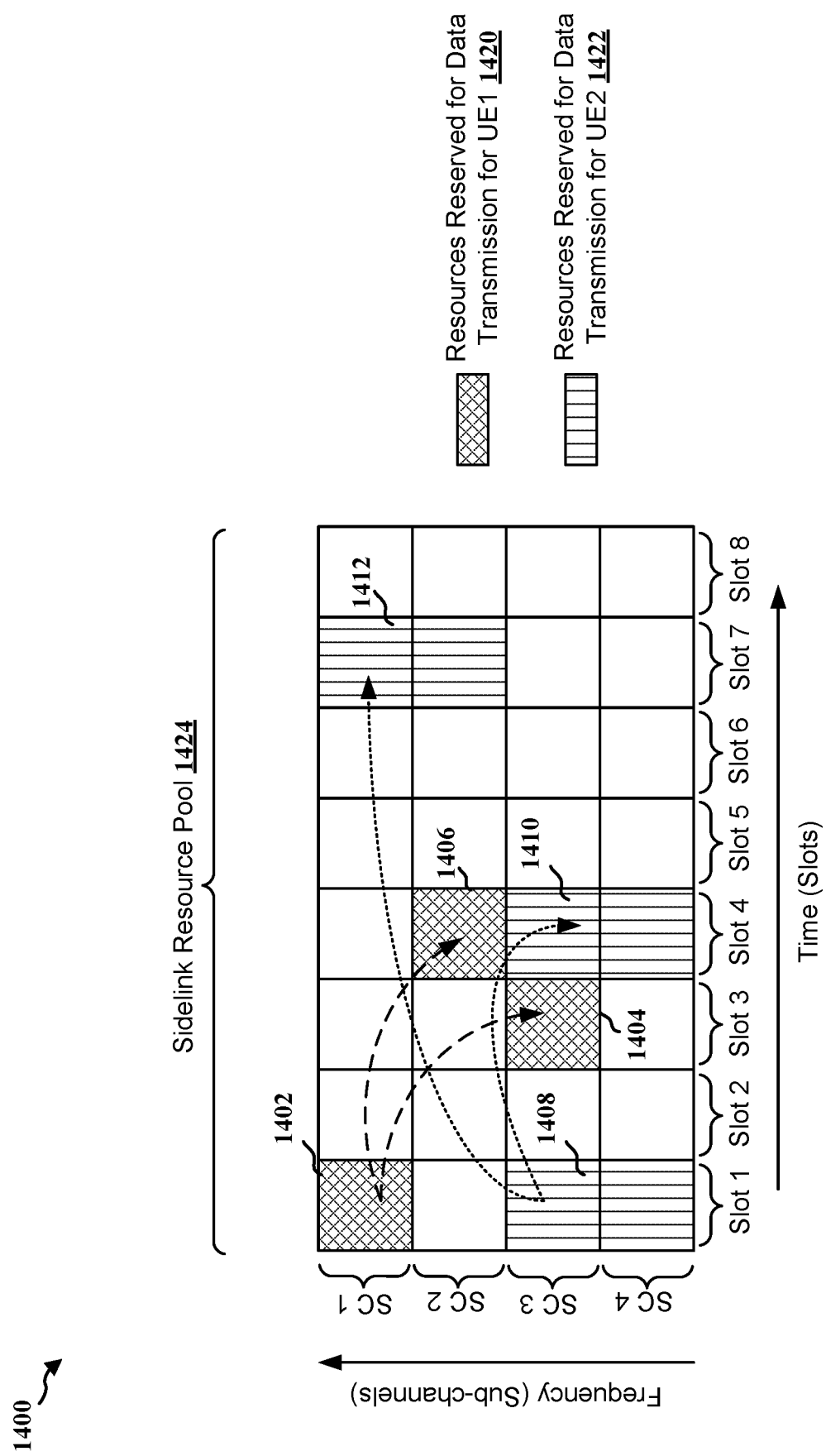
FIG. 14 is a diagram showing an example of resource reservations for sidelink transmissions in a sidelink resource pool.

FIG. 14 is a diagram 1400 showing an example of resource reservations for sidelink transmissions in a sidelink resource pool 1424. The resource allocation for each UE (e.g., a sidelink device) may include one or more sub-channels (SCs) in the frequency domain (e.g., SC 1 to SC 4) and a slot in the time domain. The UE may use resources in a current slot to perform data transmission, and may reserve resources in future slots for data retransmissions. In one example, as shown by diagram 1400 of FIG. 14, a sidelink UE, such as a first UE 1420 or a second UE 1422, may reserve up to two future slots for retransmissions. The resource reservation may be limited to a window or a pool with defined slots and sub-channels. For example, as shown by diagram 1400 of FIG. 14, a sidelink resource pool 1424 (which may also be referred as a resource selection window) may include an eight (8) slots by four (4) sub-channels window, which may provide thirty-two (32) available resource blocks in total. The first UE 1420 (e.g., UE1) may reserve a resource 1402 that includes a sub-channel (e.g., SC 1) in a current slot (e.g., slot 1) for data transmission, and may reserve two additional future sub-channels and slots within the sidelink resource pool 1424 for data retransmissions. For example, the first UE 1420 may reserve a resource 1404 that includes a sub-channel (e.g., SC 3) at slots 3 and a resource 1406 that includes a sub-channel (e.g., SC 2) at slot 4 for future retransmissions as shown by FIG. 14. Although the example shows a reservation of two additional slots of resources, the reservation may be for one additional slot of resources or may be a reservation for a slot for an initial transmission without the additional reserved resources. After selecting and/or reserving resources for transmission and/or retransmission, the first UE 1420 may transmit its resource reservation information to other UEs, such as the second UE 1422. For example, the first UE 1420 may transmit its resource reservation information in SCI, such as using a reservation resource field in the SCI. The SCI may be a first stage SCI. Similarly, the second UE 1422 may reserve a resource 1408 that includes two sub-channels (e.g., SC 3 and SC 4) at time slot 1 for its current data transmission, and may reserve a resource 1410 that includes two sub-channels (e.g., SC 3 and SC 4) at time slot 4 and a resource 1412 that includes two sub-channels (e.g., SC 1 and SC 2) at time slot 7 for retransmissions. After selecting and/or reserving resources for transmission and/or retransmission, the second UE 1422 may also transmit its resource reservation information to other UE(s), such as the first UE 1420, through SCI.

If a third UE (e.g., UE 3) is to select one or more resources from the sidelink resource pool 1424 for data transmission and/or retransmission, the third UE may first decode SCIs within a time period to identify which resources (e.g., candidate resources) are available, such as resources that have not been reserved by other UEs. Then, the third UE may use unreserved resources for data transmission. For example, the third UE may receive and decode SCIs transmitted from the first UE 1420 and the second UE 1420, and the third UE may determine that resources 1402, 1404, 1406, 1408, 1410 and 1412 within the sidelink resource pool 1424 have been used/reserved by the first UE 1420 and the second UE 1422. As such, the third UE may exclude these resources from its candidate resources, and the third UE may select other unreserved/unused resources (e.g., available sub-channels and time slots) as the candidate resources for data transmission and retransmissions, which may be based on a number of adjacent sub-channels in which the data (e.g., packet) to be transmitted can fit.

As mentioned above, a sidelink resource reservation may be periodic or aperiodic. If the resource reservation is configured to be periodic, the periodic resource reservation may be turned on or off by a configuration in a sidelink resource pool. Also, a UE may be configured to continue monitoring resource reservation messages (e.g., SCIs) sent by other UE(s) or stations so that the UE may maintain a sensing history regarding which resources are being used and/or reserved. Then, the UE may perform resource selection based at least in part on the sensing history when the UE has a packet for transmission. The UE may maintain reservation information for a period of time, e.g., within a sensing window (e.g., the sensing window 1506). The length of the sensing window may be configured for the UE, such as by a base station. Each resource reservation may have a priority level indicated in the SCI, such that a transmission (e.g., a packet) with a higher priority reservation may pre-empt a transmission with a lower priority reservation.

A UE may perform signal/channel measurement for a sidelink resource that has been reserved and/or used by other UE(s), such as by measuring the reference signal receive power (RSRP) of the message (e.g., the SCI) that reserves the sidelink resource. Based at least in part on the signal/channel measurement, the UE may consider using/reusing the sidelink resource that has been reserved by other UE(s). For example, a UE may consider a reserved resource to be available when the measured RSRP for the message reserving the resource is below a threshold, and then the UE may use/reuse the reserved resource for transmission. When the measured RSRP is below the threshold, it may indicate that the UE reserving the resource may be distant, and the use/reuse of the reserved resource may be less likely to cause interference or impact to that UE. In some examples, the threshold for the RSRP may be determined or changed based on the amount of available resources in a resource selection window. For example, if the amount of available resources is below a threshold/percentage (e.g., below 20%) within a resource selection window, the UE may be configured to use an increased/higher RSRP threshold so that the UE is more likely to be able to reuse reserved resources. In addition, a sidelink (or packet) transmission or retransmission may be configured with a packet delay budget (PDB), which may provide a time in which the sidelink transmission or retransmission is to be transmitted by a UE. If the UE is unable to transmit the sidelink transmission within the PDB, the UE may be configured to abort or discard the transmission, and restart the sidelink resource sensing and selection process. Aspects presented herein may enable a UE to find a balance between excluding reserved resources (e.g., to avoid collisions with other UEs) and reusing reserved resources (e.g., to increase resource usage), such that the UE may be able to select sidelink resources that meet packet delay budgets of its transmissions while avoiding resource collision.

Figure 15:
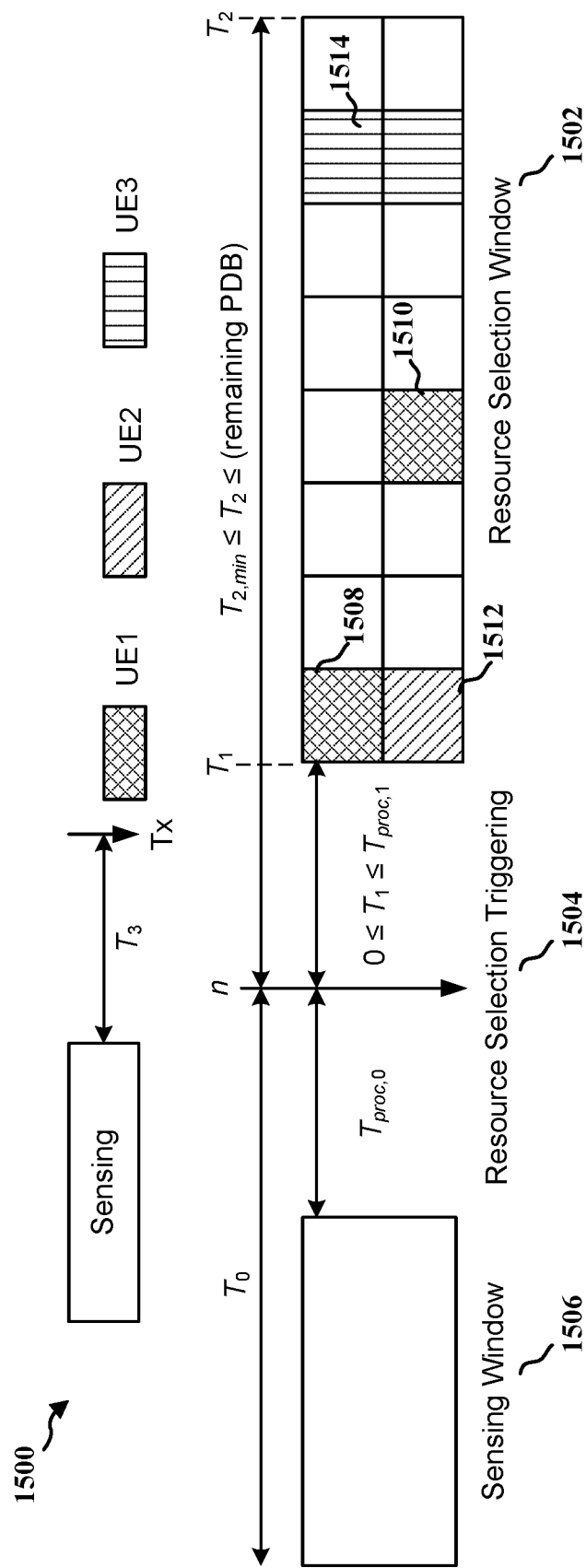
FIG. 15 is an example showing a timeline for a sensing-based resource selection.

FIG. 15 is an example showing a timeline 1500 for a sensing-based resource selection. A UE may select radio resources from a resource selection window 1502, which is illustrated as having sixteen (16) resource blocks formed by two sub-channels and eight slots in this example. The duration of the resource selection window 1502 may be represented by [n+T$_1$, n+T$_2$], where n may represent the time a resource selection is triggered, such as shown at 1504 when the UE is to select a sidelink resource for transmission. T$_1$ may represent the starting of the resource selection window 1502 and T$_2$ may represent the end of the resource selection window 1502. The length of the resource selection window 1502 may vary depending on the configuration, and may be configured for the UE via an upper layer (e.g., from 20 ms to 100 ms etc.). In some examples, the value of T$_1$ may be selected from a time between zero (0) and the time it takes the UE to process and implement the resource selection (e.g., T$_{proc,1}$) and T$_2$ may be selected from a time between T$_{2,min}$ and the remaining of a PDB duration associated with the transmission. In some examples, T$_{2,min}$ may be configured per each sidelink priority value which may be indicated in SCI from the following set of values: 1, 5, 10, 20·2$^{\mu-1}$ slots, where $\mu$=1, 2, 3, 4 for 15, 30, 60, 120 kHz sub-carrier spacing (SCS) respectively. PDB may be used to define the upper limit of a delay suffered by a packet between the UE and policy and charging enforcement function (PCEF).

As a UE may sense and decode sidelink messages (e.g., SCIs) from other UE(s), a sensing history (or resource use/reservation history) may be recorded/determined from a sensing window 1506 and used by the UE to determine which resources in the resource selection window 1502 are reserved by other UE(s). For example, the sensing window 1506 may represent a time duration prior to the resource selection during which the UE may collect resource reservation related information from other UEs (e.g., via their SCIs). In one example, the time duration may be the last 1000 ms prior to the resource selection triggering at 1504. In other examples, the sensing window 1506 may have a duration between 100 ms to 1100 ms, as represented by T$_0$ in FIG. 15, minus the time it takes the UE to process the sensing window 1506 (e.g., T$_{proc,0}$).

Based on the resource reservation related information obtained during the sensing window 1506, the UE may determine available candidate resources for the resource selection window 1502. For example, based on the resource reservation information decoded from SCIs of other UEs (e.g., UE1, UE2 and UE3), the UE may discover that UE1 has transmitted a data during the sensing window 1506 and has reserved resource blocks 1508 and 1510 in the resource selection window 1502 for retransmission of the data. Similarly, based on the sensing window 1506, the UE may discover that resource blocks 1512 and 1514 have been reserved by UE2 and UE3 for their retransmissions respectively as shown in FIG. 15. As such, the UE may determine that resource blocks 1508, 1510, 1512 and 1514 in the resource selection window 1502 are not available for selection and may excluded these resource blocks from selection. Then, the UE may identify the remaining resource blocks as available candidate resources. The UE may perform the sensing up to a defined duration (e.g., T$_3$) before its transmission.

At times, it may not be easy for a UE to find available resources in a sidelink channel (e.g., within a resource selection window) when the sidelink channel is congested.

In some examples, the congestion may be caused by the aforementioned sensing-based (e.g., the resource reservation) mechanism when a large amount of resources is being excluded from candidate resources because they have been reserved by other UEs for retransmissions. For example, referring back to FIG. 14, the UE 1420 may have reserved resources 1404 and 1406 for retransmission and the UE 1422 may have reserved resources 1410 and 1412 for retransmissions. Thus, these resources may be excluded from other UE's resource selection. In some examples, a UE that reserves a resource may not use the reserved resource. For example, the UE 1420 may transmit a packet using the resource 1402 and the UE 1420 may have also reserved resources 1404 and 1406 for retransmission of the packet. However, if the transmission of the packet using the resource 1402 is successfully, such as when a positive feedback (e.g., HARQ ACK) is received for the transmission, the UE 1420 may determine to skip or abort the retransmissions. For example, the UE 1420 may determine not to use the reserved resources 1404 and 1406 when the transmission using the resource 1402 is successful. This may cause the resources 1404 and 1406 to be excluded from other UEs' resource selection, and the resources 1404 and 1406 may become wasted because they are not utilized by the UE 1420 that reserves them. In addition, when a sidelink channel is congested, packet collisions may also be more likely to occur when multiple UEs are attempting to transmit/retransmit packets across the sidelink channel at the same time.

In one aspect of the present disclosure, to avoid excessive resources exclusion/waste due to resources being reserved for retransmission but not used, a UE may be configured to monitor HARQ-feedback of other UE(s) to determine the likelihood of whether a reserved resource is going to be used by the UE(s) that reserves the resource. For example, referring back to FIG. 14, the UE 1420 may use the resource 1402 (e.g., at sub-channel SC 1 and slot 1) for data transmission, and the UE 1420 may reserve resources 1404 and 1406 (e.g., at sub-channels SC 3 and slots 3, and SC 2 and slot 4) for data retransmissions. A transmitting UE may monitor whether a negative acknowledgement (NACK) is received by the UE 1420 after the UE 1420 transmits the data using the resource 1402. If a NACK is received by the UE 1420, the transmitting UE may assume that the data transmission from the UE 1420 was not successful, and that the UE 1420 is likely to use the reserved resources 1404 and/or 1406 for retransmissions. On the other hand, if a NACK is not received by the UE 1420, the transmitting UE may assume/determine that the data transmission from the UE 1420 using the resource 1402 is successful and that the UE 1420 may skip retransmissions of the data using the reserved resources. As such, the transmitting UE may reclaim/reuse resources (e.g., resources 1404 and/or 1406) reserved by the UE 1420 for its own use (e.g., for its data transmission). However, monitoring HARQ-feedback for transmissions of other UEs may increase the workload of a UE.

In other examples, a UE may measure reference signal receive power (RSRP) of a sidelink transmission (e.g., SCI in PSCCH and/or PSSCH) from another UE, and the UE may estimate whether one or more reserved resources may be reclaimed for their use based at least in part on the measured RSRP of the sidelink transmission. In some examples, the RSRP may correspond, e.g., to the linear average over the power contributions of the resource elements that carry a signal, such as demodulation reference signals. The power per resource element may be determined from the energy received during the useful part of the symbol, e.g., excluding the cyclic prefix. Thus, when a UE is selecting a sidelink resource for transmission, the UE may be configured to exclude resources that are reserved by sidelink messages (e.g., SCIs) having measured RSRP higher than a threshold. On the other hand, if the RSRP of a sidelink message reserving a resource does not exceed the threshold, the UE may not exclude the reserved resource, and the UE may select the reserved resource for its transmission.

A sidelink transmission may include a sidelink control channel (PSCCH) and/or a corresponding data channel (e.g., PSSCH). A control channel may include information, e.g., sidelink control information (SCI) for decoding the data channel. The SCI may include reservation information that indicates time and/or frequency resources that the UE intends to use for the data channel transmission. For example, the SCI may indicate a number of slots, as well as the RBs that will be occupied by the data transmission. The SCI may also be received by receiving devices, or other nearby device, to avoid interference by refraining from transmitting on the reserved resources.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may transmit reservations of the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate available resources for sidelink transmission by the UE, and the UE may select/reserve resources for a sidelink transmission from the resources that are unused and therefore form the set of available resources. The UE may continuously perform sensing for SCI with resource reservations in order to maintain a set of candidate available resources from which the UE may select one or more resources for a sidelink transmission. Once the UE selects an available resource for transmission, the UE may transmit SCI indicating its own reservation of the selected resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 4A:
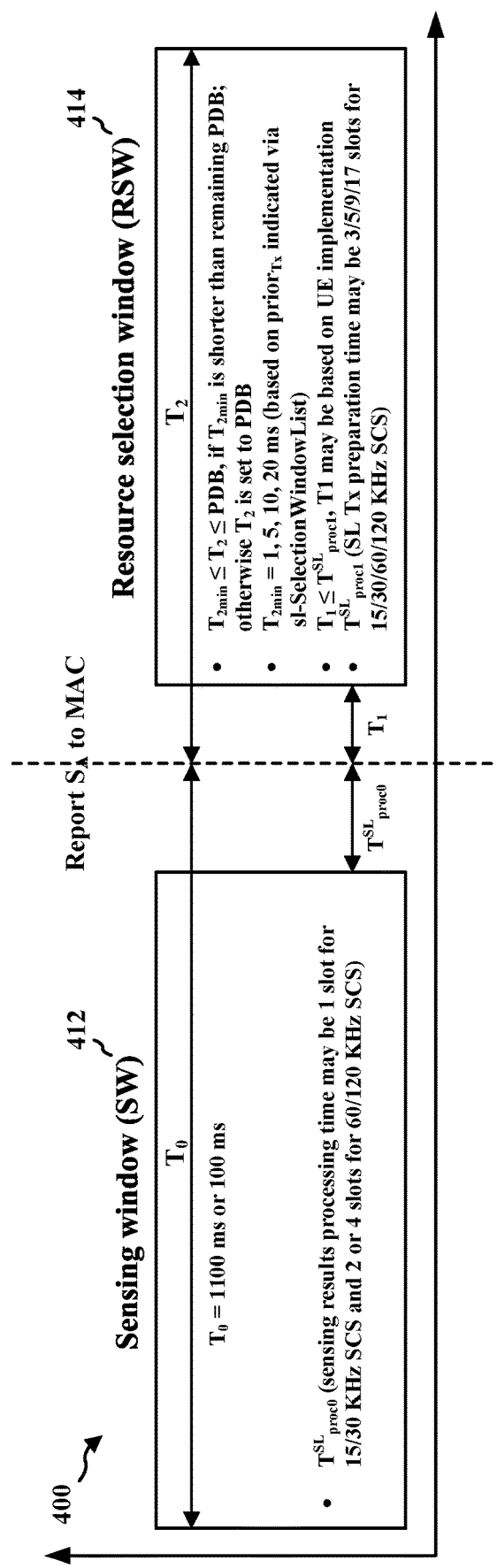
FIG. 4A illustrates a diagram associated with resource selection parameters.
Figure 4B:
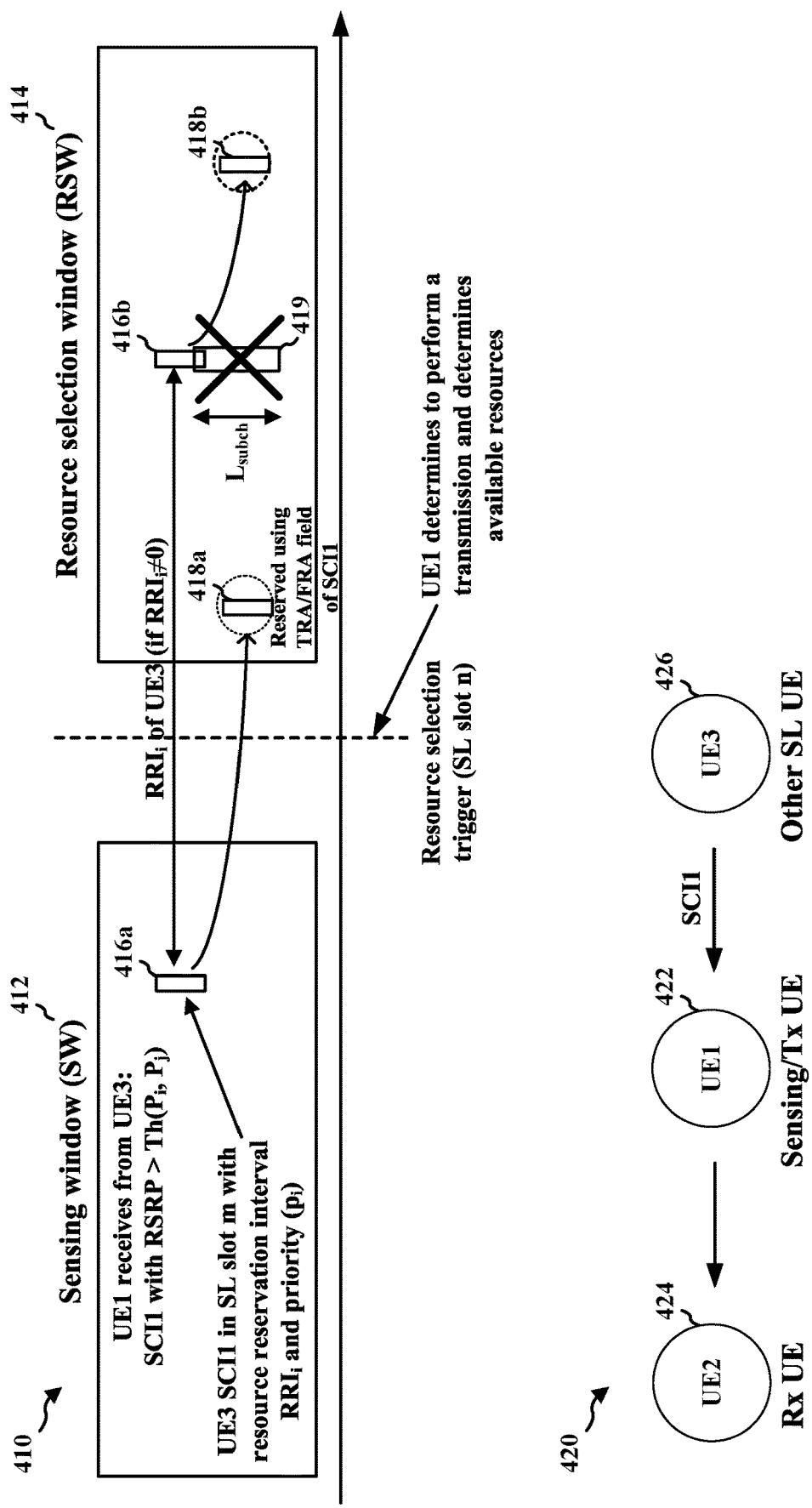
FIG. 4B illustrates diagrams associated with resource availability determinations based on first stage SCI (SCI1).

FIG. 4A illustrates a diagram 400 associated with resource selection parameters. FIG. 4B illustrates diagram 410 and diagram 420 associated with resource availability determinations based on first stage SCI (SCI1) according to one or more examples. Mode 2 sidelink resource determination procedures may not include signaling from a base station to indicate to a sensing/Tx UE, such as UE1 422, which resources the sensing/Tx UE may use for a transmission to an Rx UE. Instead, UE1 422 may determine time-frequency resources for the transmission to the Rx UE, such as UE2 424, based on received SCI from other sidelink UEs, such as UE3 426. UE1 422 may determine that UE3 426 is in proximity to UE1 422 based on channel sensing. For example, channel sensing may be performed by the PHY layer of UE1 422, which may be triggered by the MAC layer of UE1 422, if the MAC layer has data to transmit. The MAC layer may indicate sensing parameters to the PHY layer.

UE1 422 may further determine the time-frequency resources that UE1 422 may use for the transmission to UE2 424 based on an SCI1 received from UE3 426 indicative of the time-frequency resources that are already reserved by UE3 426. UE1 422 may listen for control signals from other sidelink UEs, such as UE3 426, as control signaling, such as the SCI1, may include resource reservation information for UE3 426. Based on the resource reservation information, UE1 422 may determine available and unavailable resources. The resources may be selected from a set of available resources ($S_A$) for an initial transmission, one or more retransmissions, and/or one or more periodic transmissions. The sensing/Tx UE may perform full sensing in some cases, where the sensing/Tx UE is assumed to be continuously sensing the channel. In other examples, the sensing/Tx UE may perform partial sensing, where the sensing/Tx UE may sense the channel based on non-continuous techniques.

The sensed/received SCI1 from UE3 may indicate to UE1 422 one or more scheduled transmissions of UE3 426 associated with particular times and frequencies of a bandwidth. For example, the SCI1 may include resource reservation information indicative of resources that may be used for future transmissions of UE3 426. Based on the resource reservations, UE1 422 may determine which resources are available for UE1 422 to use for the transmission to UE2 424. That is, the reservation information included in the SCI1 may allow UE1 422 to determine the resources that UE3 426 may be using for other transmissions.

Figure 9:
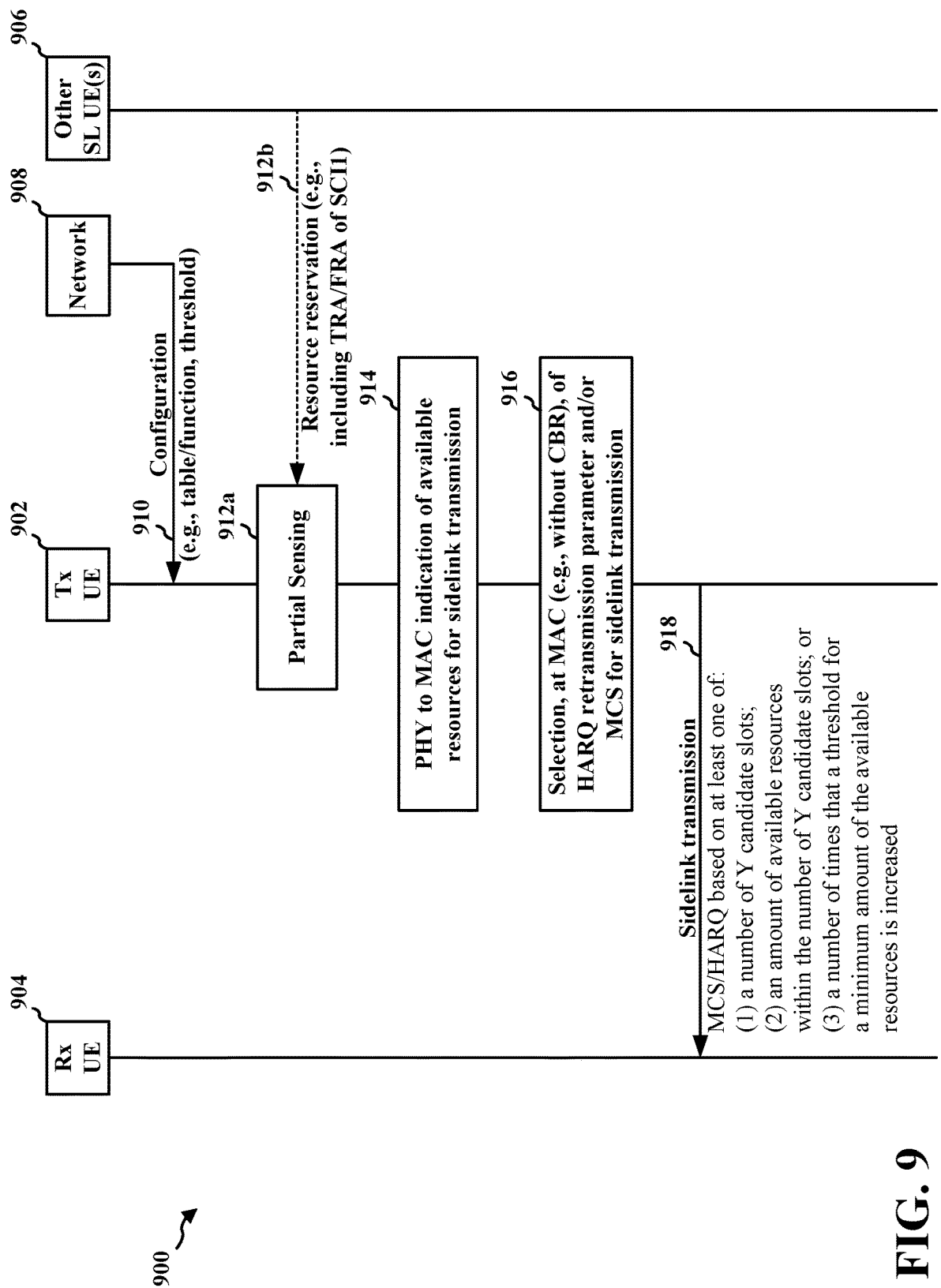
FIG. 9 is a call flow diagram illustrating communications between a transmit (Tx) UE, a receive (Rx) UE, other sidelink UE(s), and a network.

SCI may include a time resource assignment (TRA)/frequency resource assignment (FRA) field as well as a resource reservation interval (RRI) field that may be indicative of resource reservations. The TRA/FRA field may be used for reserving resources for retransmission. For example, retransmission resource 418a and retransmission resource 418b may be reserved using the TRA/FRA field of SCI1 FIG. 9 illustrates an example of a resource reservation that includes a TRA/FRA, e.g., at 912b. The SCI1 of UE3 426 may be received by UE1 422 in a sidelink slot m with an RRI of $RRI_i$ and priority $p_i$. The RRI field may be indicative of periodic transmissions. The time interval between two periodic transmissions may be equal to the RRI. The diagram 410 illustrates an example $RRI_i$ of UE3 426, where the $RRI_i$ may ≠0. UE1 422 may determine resources that other sidelink UEs, such as UE3 426, may be using for transmissions based on a first transmission resource 416a and a second transmission resource 416b that occupy a same frequency resource (e.g., periodic transmissions). UE1 422 may utilize remaining available resources for a transmission to UE2 424.

An available resource determination by UE1 422 may be based on an RSRP of a received SCI, a transmission priority of UE1 422, and/or a priority indicated via the received SCI. In the diagram 410, UE1 422 may receive from UE3 426 the SCI1 with an RSRP>Th($P_i$, $P_j$). If the RSRP of the received SCI is higher than the RSRP threshold, the resources reserved by the received SCI may be determined as unavailable resources for UE1 422. If the RSRP of the received SCI is lower than the RSRP threshold, a same resource indicated by the SCI may be determined as available for UE1 422. UE1 422 may generate $S_A$ at the PHY layer that may be used by UE1 422 to select transmission resources at the MAC layer.

Resource selection parameters at the MAC layer may be indicated to the PHY layer. The MAC layer may determine data to be transmitted by UE1 422 and may indicate to the PHY layer one or more resources during a resource selection window (RSW) 414, associated with a time $T_2$, from which the MAC layer may select one or more resources for transmission. At a sidelink slot n, the MAC layer may trigger the PHY layer to determine a set of available resources from which the MAC layer will select the resources for transmission. The PHY layer may sense a channel during a sensing window (SW) 412 associated with a time $T_0$ and may report $S_A$ to the MAC layer. In examples, $T_0$ may correspond to 1100 ms or 100 ms, which may be equal to a duration of the SW 412 minus a sensing results processing time $T^{SL}_{proc0}$. The sensing results processing time may be 1 slot for 15/30 KHz SCS and 2 or 4 slots for 60/120 KHz SCS. UE1 422 may determine to perform a transmission and may determine available resources at an end of the sensing results processing time $T^{SL}_{proc0}$ that follows the SW 412, where the sensing results processing time $T^{SL}_{proc0}$ may precede the RSW 414 by a time $T_1$.

Time $T_2$ associated with the RSW 414 may similarly correspond to a time $T_1$ that precedes the RSW 414 plus a duration of the RSW 414. Time T2 may be characterized via $T_{2\,min} \leq T_2 \leq PDB$, if $T_{2\,min}$ is shorter than a remaining packet delay budget (PDB). Otherwise time $T_2$ may correspond to the PDB. $T_{2\_min}$ may be equal to 1 ms, 5 ms, 10 ms, 20 ms, etc., based on an L1 priority of the transmission (prior$_{Tx}$) indicated via sidelink selection window information, such as a sl-SelectionWindowList. For instance, priority values of 0, 1, 2, 3, 4, 5, 6, 7 may map to 20 ms, 20 ms, 20 ms, 20 ms, 10 ms, 10 ms, 10 ms, 10 ms, respectively. In examples, $T_1$ may be $\leq T^{SL}_{proc1}$, where $T_1$ may be based on UE implementation. The sensing results processing time $T^{SL}_{proc1}$ may correspond to a sidelink Tx preparation time and may be 3/5/9/17 slots for 15/30/60/120 KHz SCS.

In order for the PHY layer to begin sensing the channel to determine resources that may be available for transmissions of UE1 422, the MAC layer may indicate one or more sensing parameters to the PHY layer to perform the sensing of the channel during the SW 412. Parameters indicated from the MAC layer to the PHY layer may include an indication of a resource pool for resource selection by the MAC layer. That is, the MAC layer may indicate which resource pool the PHY layer may use to perform the sensing of the channel during the SW 412. The MAC layer may also indicate parameters such as an L1 priority of the transmission (prior$_{Tx}$), a remaining PDB associated with a time at which the transmission is to be performed, a bandwidth/number of subchannels ($L_{subch}$), a resource reservation interval ($P_{rsvp\_Tx}$) in cases of multiple MAC PDUs (e.g., for periodic transmissions), etc. Accordingly, the MAC layer may indicate parameters to the PHY layer, which the PHY layer may use for sensing procedures.

For reevaluation and preemption techniques, the MAC layer may provide to the PHY layer a first set of resource ($r_0$, $r_1$, $r_2$, . . . ) for reevaluation and a second set of resources ($r'_0$, $r'_1$, $r'_2$, . . . ) for preemption. Preemption procedures may be enabled based on parameters such as sl-PreemptionEnable. UE1 422 may sense/monitor for SCI from UE3 426 in the SW 412. UE1 422 may perform continuous sensing when operating in a full sensing mode. However, continuous/full sensing may cause UE1 422 to consume an increased amount of power. Thus, partial sensing may be performed by UE1 422 to reduce the amount of power consumed by UE1 422 based on reducing the sensing load at the PHY layer. The PHY layer may report the set of available resources $S_A$ to the MAC layer for slot n for selection of resources by the MAC layer during the RSW 414. The MAC layer may trigger resource selection at sidelink slot n. The set of available resources $S_A$ may be initialized for the sidelink resources in the RSW 414. UE1 422 may exclude resources from the set of available resources $S_A$ before reporting the set of available resources $S_A$ to the MAC layer.

UE1 422 may determine available resources based on excluding resources that are reserved, or which may be reserved, by other UEs, such as UE3 426. The $S_A$ may be initialized for sidelink resources included in the RSW 414. Resources reserved by other UEs (e.g., UE3 426) may be excluded from the $S_A$. A resource pool for the sidelink resources may include a set of allowed resource reservation intervals (RRIs) in sidelink resource reservation information for periodic resources, such as a sl-ResourceReservePeriodList, which may correspond to a subset of values included in $\{0, 1, 2, \ldots, 99, 100, 200, \ldots, 1000\}$ ms.

UE1 422 may include an indication of one or more sidelink RSRP thresholds for PSSCH, e.g., which may be referred to as a sl-ThresPSSCH-RSRP-List, which may provide an RSRP threshold for ($p_i,p_j$), where $p_i$ corresponds to a priority of UE3 426 in SCI1 and $p_j$ corresponds to a priority of UE1 422 (e.g., $p_j$=prio$_{Tx}$). If UE1 422 receives SCI1 from UE3 426 (e.g., if sl-RS-ForSensing is set to PSCCH) with RSRP>Th($p_i,p_j$) in SW 412 and the SCI1 from UE3 426 reserves resources in the RSW 414 using the RRI or a time resource assignment (TRA) in the SCI1 of UE3 426, then UE1 422 may excludes resources in the RSW 414 corresponding to reservations of UE3 426. If sl-RS-ForSensing is set to PSSCH, UE1 422 may measure the RSRP over DMRS resource elements for the PSSCH. If UE1 422 is selecting resources for periodic transmission (i.e., UE1 422 has $P_{rsvp\_Tx}$), the MAC layer of UE1 422 may select a value for the RRI associated with $P_{rsvp\_Tx}$, which may be larger than a remaining PDB of the sidelink data available in the logical channel (e.g., RRI>PDB$\geq T_2$).

Prior to UE1 422 determining to transmit and determining available resources for transmission, the PHY layer may sense the channel/receive SCI from other sidelink UEs, such as UE3 426. In an example, UE1 422 may receive SCI from UE3 426 with an RSRP that is greater than the RSRP threshold. The SCI may include the resource reservation information of UE3 426, which may be associated with the RRI. The SCI transmitted from UE3 426 to UE1 422 may indicate time-frequency resources that UE3 426 may use to perform a transmission (e.g., at a time period of the RRI into the future). Contiguous $L_{subch}$ resources 419 that overlap with reserved resources of UE3 426, such as an overlap with the second transmission resource 416b, may be excluded as available resources for transmissions of UE1 422.

The resources for a next transmission may also be associated with a reservation for a retransmission of a packet, which may be based on the TRA/FRA field. For example, the TRA/FRA field may be indicative of a retransmission of the packet at a particular time. If the UE1 receives an SCI with an RSRP that is greater than the RSRP threshold, UE1 may determine that associated resources are not available or may be used by UE2. Since the RSRP is greater than the RSRP threshold, the resources may also be unavailable for the MAC layer of UE1 to use for transmission.

Figure 5:
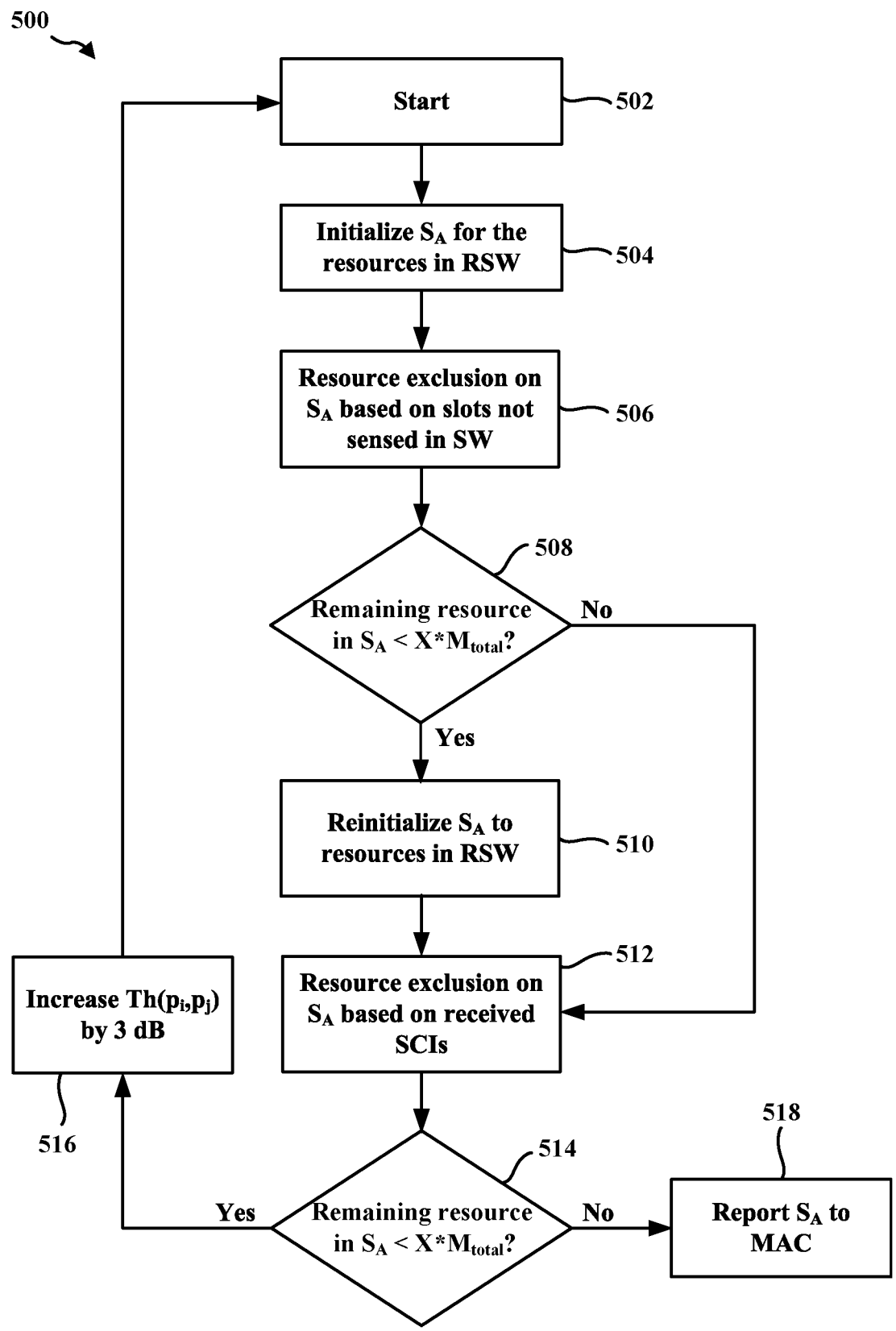
FIG. 5 is a flow diagram illustrating an available resource determination procedure performed at the physical (PHY) layer for full sensing.

FIG. 5 is a flow diagram 500 illustrating an available resource determination procedure performed at the PHY layer for full sensing. The PHY layer may perform a plurality of procedures for sensing the channel. After the MAC layer indicates the sensing parameters, the PHY layer may start a channel sensing procedure, at 502. The PHY layer may initialize, at 504, the set of available resources $S_A$ for the resources in the RSW. For example, the PHY layer may assume that all of the resources in the RSW are available resources upon initialization, at 504. The RSW may correspond to a window of resources from which the MAC layer may select transmission resources of the UE.

Resource exclusion may be performed, at 506, on the set of available resources $S_A$ based on slots that are not sensed in the SW. The Tx UE may assume that another sidelink UE is transmitting an SCI on resources where the Tx UE is not sensing the channel. Future resources associated with resources where the Tx UE is not sensing the channel may be determined as unavailable resources for the Tx UE. The set of available resources $S_A$ that the PHY layer reports to the MAC layer after the resource exclusion, at 506, may include a certain amount of remaining resources.

At 508, the PHY layer may determine whether the remaining resources in the set of available resources $S_A < X^* M_{total}$. $M_{total}$ may correspond to the total number of $L_{subch}$ contiguous subchannels in the RSW. X may be based on $p_i$=prio$_{Tx}$ and may be indicated via sl-TxPercentageList. Example values for X may include 0.2, 0.35, and 0.5. If after the resource exclusion, at 506, the amount of resources remaining in the set of available resources $S_A$ is less than $X^* M_{total}$, the set of available resources $S_A$ may be reinitialized, at 510, to the resources in the RSW. That is, the set of available resources may be adjusted so that the MAC layer has enough available resources for performing resource selection.

After re-initialization, at 510, resource exclusion may be performed, at 512, on the set of available resources $S_A$ based on received SCIs from other sidelink UEs. In examples where the remaining resources in the set of available resources $S_A$ are determined, at 508, to be greater than or equal to $X*M_{total}$, the resource exclusion may be performed, at 512, without re-initialization, at 510, of the set of available resources $S_A$. The resources that are used by the other sidelink UEs may also be excluded from the set of available resources $S_A$ based on the RSRP threshold.

If the remaining resources in the set of available resources $S_A$ are determined, at 514, to be greater than or equal to $X*M_{total}$, the PHY layer may generate the set of available resources $S_A$ and report, at 518, the set of available resources $S_A$ to the MAC layer. If after the resource exclusion, at 512, the number of resources remaining in the set of available resources $S_A$ is less than $X \cdot M_{total}$, $Th(p_i,p_j)$ may be increased, at 516, by 3 dB for each priority value $Th(p_i,p_j)$ and the available resource determination procedure may be restarted, at 502.

Figure 6:
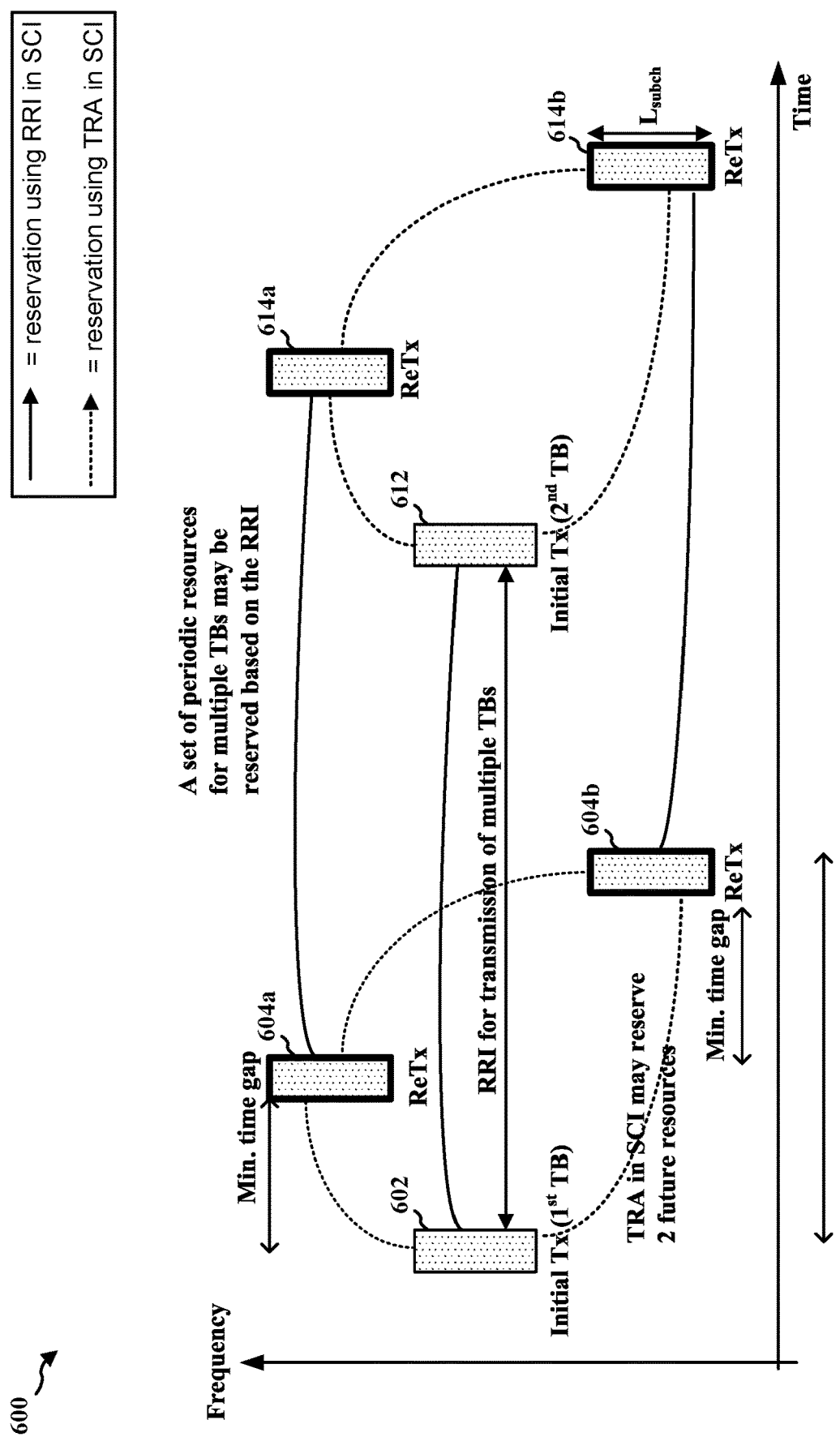
FIG. 6 is a diagram that illustrates a resource allocation for one or more initial transmissions and one or more retransmissions.

FIG. 6 is a diagram 600 that illustrates a resource allocation for one or more initial transmissions 602/612 and one or more retransmissions 604a-604b/614a-614b. An aperiodic transmission may be based on a single TB, which may correspond to a MAC PDU for a single transmission, and may be indicative of an initial transmission 602/612 as well as one or more retransmissions 604a-604b/614a-614b (e.g., HARQ retransmissions). Periodic transmissions may be based on multiple TBs, which may correspond to multiple transmission periods where each transmission period corresponds to a MAC PDU. Each transmission period may include an initial transmission 602/612 as well as one or more retransmissions 604a-604b/614a-614b (e.g., HARQ retransmissions) of a single MAC PDU.

The MAC layer may select resources for one or more PDUs. For example, the PHY layer may report $S_A$ to the MAC layer (e.g., after a resource exclusion procedure), such that the MAC layer may select resources for an aperiodic/periodic transmission from $S_A$ for transmission of a single/first MAC PDU. For multiple TBs, the MAC layer may select a set of periodic resources that are separated based on the RRI associated with the selected resource. The MAC layer may determine the number of HARQ retransmissions and select HARQ transmission resources for each TB from $S_A$. The total number of HARQ transmissions may be ≤sl-MaxTxTransNumPSSCH (1, . . . , 32), and may be based on the channel busy ratio (CBR) and Tx priority.

If a physical sidelink feedback channel (PSFCH) is configured, a minimum time gap may be included between HARQ transmissions. The minimum time gap may correspond to sl-MinTimeGapPSFCH plus a PSFCH reception and processing time as well as a sidelink retransmission preparation time including multiplexing of physical channels and a Tx/Rx switching time. In examples, a time duration corresponding to the PSFCH reception plus the processing time and sidelink retransmission preparation time may be based on UE implementation. The TRA of the SCI may indicate/reserve up to a maximum number of resources, which may be based on a parameter such as a sl-MaxNumPerReserve resources, (e.g., 2 or 3 including a current transmission of the SCI). The TRA may reserve up to 2 retransmission resources that may be up to 31 slots after the current SCI. If the retransmission resources may not be selected/indicated by the TRA of a previous SCI, time and frequency resources for the one or more retransmissions 604a-604b/614a-614b may be selected from $S_A$ based on UE implementation, where the minimum time gap between two selected resources for the PSFCH is configured for the pool of resources.

After the MAC layer of the UE selects resources for transmission, the resources may be reserved based on the TRA/FRA field of the SCI and/or based on the RRI associated with the SCI. In examples, the TRA/FRA field in the SCI may reserve two future resources (e.g., resources for two retransmissions). If the MAC layer indicates a single transmission (e.g., based on transmission of one TB), the single transmission may occur over one period. One period may include an initial transmission 602 and one or more retransmissions 604a-604b of the initial transmission 602. The one or more retransmissions 604a-604b may follow each other based on a minimum time gap and/or the initial transmission 602 based on the minimum time gap. Resource reservation information may be included in the SCI associated with the initial transmission 602.

A set of periodic resources for transmission of multiple TBs may be reserved based on the RRI. If the MAC layer indicates multiple TBs or periodic transmissions, the RRI field of SCI may be used to indicate one or more additional periods of transmission. For example, a second TB may be used to indicate the initial transmission 612, which may reserve the one or more retransmissions 614a-614b.

The TRA/FRA field may indicate future retransmissions up to 31 slots apart. Hence, if the SCI included in the one or more initial transmissions 602/612 indicates one or more retransmissions 604a-604b and one or more retransmissions 614a-614b, the future retransmission may be separated by 31 slots or less. The SCI may indicate one or more retransmissions in some examples. If the UE determines to perform a third retransmission (not illustrated in the diagram 600), the TRA/FRA field of the SCI included in the first retransmission (e.g., retransmission 604a or retransmission 614a) may be used to indicate the second retransmission (e.g., retransmission 604b or retransmission 614b), and the TRA/FRA field of the SCI included in the second retransmission (e.g., retransmission 604b or retransmission 614b) may be used to indicate the third retransmission.

Partial sensing may be performed to reduce power consumption by the Tx UE. Rather than sensing the channel continuously based on full sensing techniques and consuming an increased amount of power, the Tx UE may reduce power consumption based on sensing the channel over a subset of associated time-frequency resources. In order to reduce sensing procedures, the Tx UE may determine candidate slots (e.g., Y candidate slots associated with partial sensing) in which the Tx UE may perform transmissions. Certain protocols that the Tx UE may follow may include reserving resources for retransmission that are 31 slots or less into the future, reserving periodic resources based on predefined periodicities, etc. Partial sensing may be based on applying resource reservation protocols in the Y candidate slots to reduce the sensing load of the Tx UE.

Two types of partial sensing may include periodic-based partial sensing (PBPS) and contiguous partial sensing (CPS). PBPS may be used to determine resources that are reserved by the other sidelink UEs in proximity to the Tx UE for the other sidelink UEs to perform periodic transmissions. The determination of the resources may be based on RRIs of sensed/received SCIs. CPS may be used to determine resources that are reserved by the other sidelink UEs in proximity to the Tx UE for the other sidelink UEs to perform retransmissions. The determination of the resources may be based on the TRA/FRA field in the sensed/received SCIs.

Figure 7A:
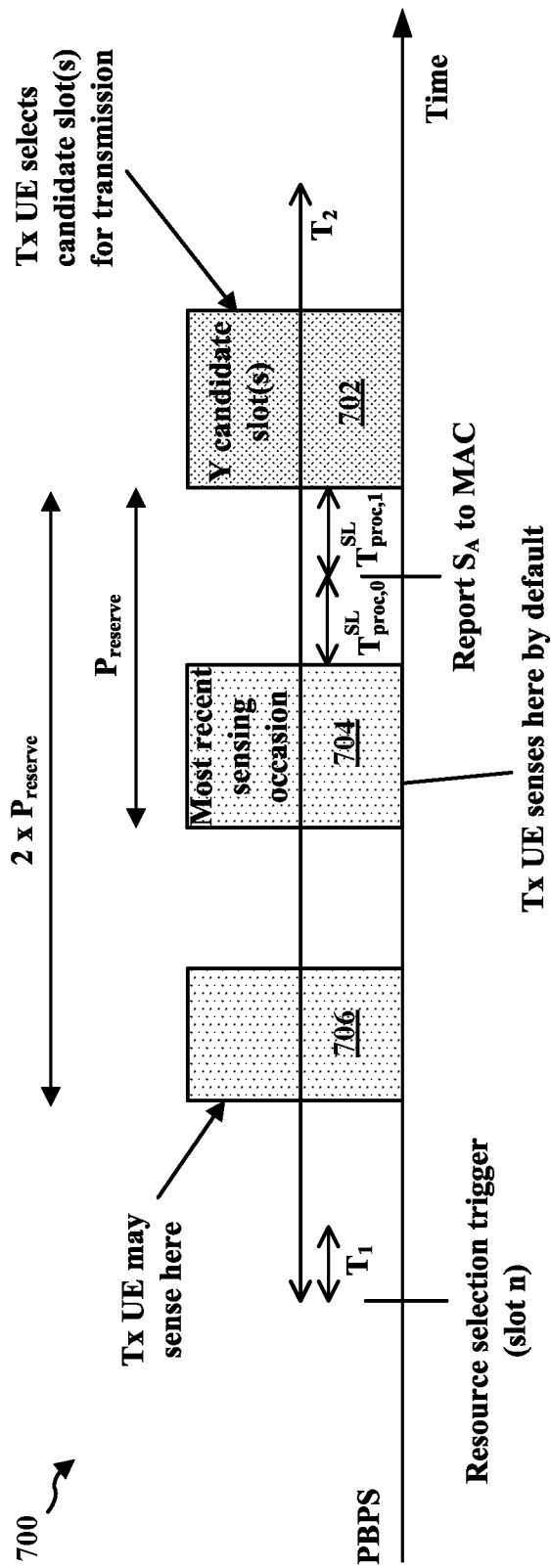
FIG. 7A illustrates a diagram associated with periodic-based partial sensing (PBPS).
Figure 7B:
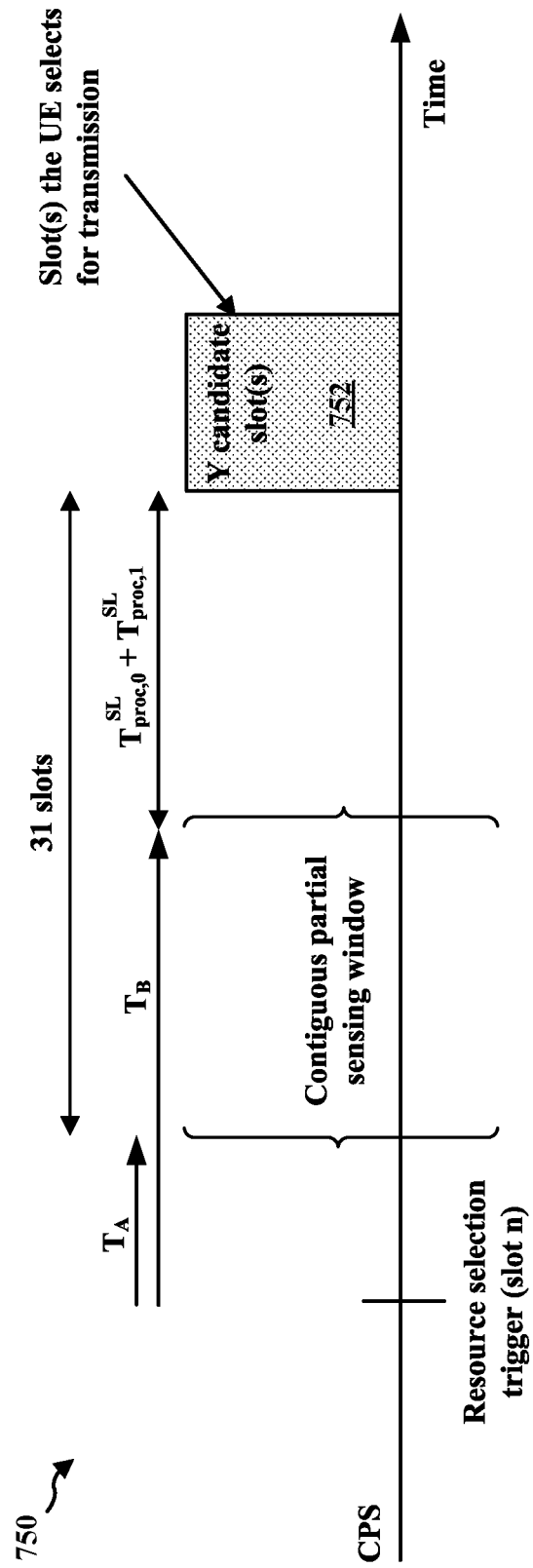
FIG. 7B illustrates a diagram associated with contiguous partial sensing (CPS).

FIG. 7A illustrates a diagram 700 associated with PBPS. FIG. 7B illustrates a diagram 750 associated with CPS. In the diagram 700, the Tx UE may use one of a fixed number of RRIs associated with a resource pool. For example, sl-ResourceReservePeriodList may correspond to a list of available RRIs that may be used within the resource pool. Based on the list of available RRIs, the Tx UE may perform periodic transmissions according to an interval determined in association with a value included in the list of available RRIs.

The Tx UE may select candidate slots for transmission from a set of Y candidate slots 702. In order to determine resources in the Y candidate slots 702 reserved by the other sidelink UEs, the Tx UE may sense the channel at a most recent sensing occasion 704 $P_{reserve}$ time prior to a start of the Y candidate slots 702. In some examples, the Tx UE may sense the channel at a prior sensing occasion 706 that is $2 \times P_{reserve}$ prior to the start of the Y candidate slots 702. $P_{reserve}$ may correspond to a value associated with a configured set of available RRIs from sl-ResourceReservePeriodList. The Tx UE may sense/monitor for each value from sl-ResourceReservePeriodList.

The Tx UE may perform a transmission within the Y candidate slots 702. A gap between the most recent sensing occasion 704 and the Y candidate slots 702 may correspond to time $T^{SL}_{proc0}$+time $T^{SL}_{proc1}$, where the PHY layer may report the set of available resources to the MAC layer between time $T^{SL}_{proc0}$ and time $T^{SL}_{proc1}$. While the most recent sensing occasion 704 may correspond to a default occasion for Tx UE sensing, a prior sensing occasion 706 after the resource selection trigger for slot n may be used for Tx UE sensing in some cases. A time $T_1$ may correspond to a time duration between a resource selection trigger for slot n and a start of the RSW. A time $T_2$ may correspond to the resource selection trigger plus the remaining PDB of the transmission.

In the diagram 750, CPS may be used to sense/monitor for reservations for retransmissions, which may be similarly associated with the Y candidate slots 752 where the Tx UE may perform a transmission. When the other sidelink UEs are reserving resources for retransmissions, the other sidelink UEs may have the capability to reserve resources for retransmission up to 31 slots into the future. If the Tx UE attempts to determine whether any of the resources are reserved in the Y candidate slots 752, the Tx UE may limit sensing procedures to 31 slots or less away from the Y candidate slots 752. The Tx UE may sense/monitor for the SCI that may include retransmission reservations up to 31 slots into the future. In examples, the SCI may indicate two resources reservations for retransmissions. The resource reservations for the retransmissions may be 31 slots or less from a slot associated with the SCI.

A processing time may precede the Y candidate slots 752. Thus, the resource reservations may be 31 slots or less from a starting point of the processing time that is offset from the Y candidate slots 752. The starting point of the processing time may correspond to a time $T_B$ that is measured from the resource selection trigger in slot n. A contiguous partial sensing window may begin at an end of the time $T_A$. A time $T_B$ may correspond to a time duration between the resource selection trigger for slot n and an end of the contiguous partial sensing window.

The processing time may be used by the Tx UE to compute a result from the set of available resources $S_A$. For example, n+$T_A$ may correspond to 31 slots before the Y candidate slot(s) that may be used by the Tx UE for transmission. Similarly, n+$T_B$ may correspond to a time that precedes the Y candidate slot(s) that may be used by the Tx UE for transmission. A processing time period that follows the contiguous partial sensing window but precedes the Y candidate slots 752 may correspond to a sensing results processing time ($T^{SL}_{proc,0}$) plus a sidelink transmission preparation time ($T^{SL}_{proc,1}$).

Figure 8:
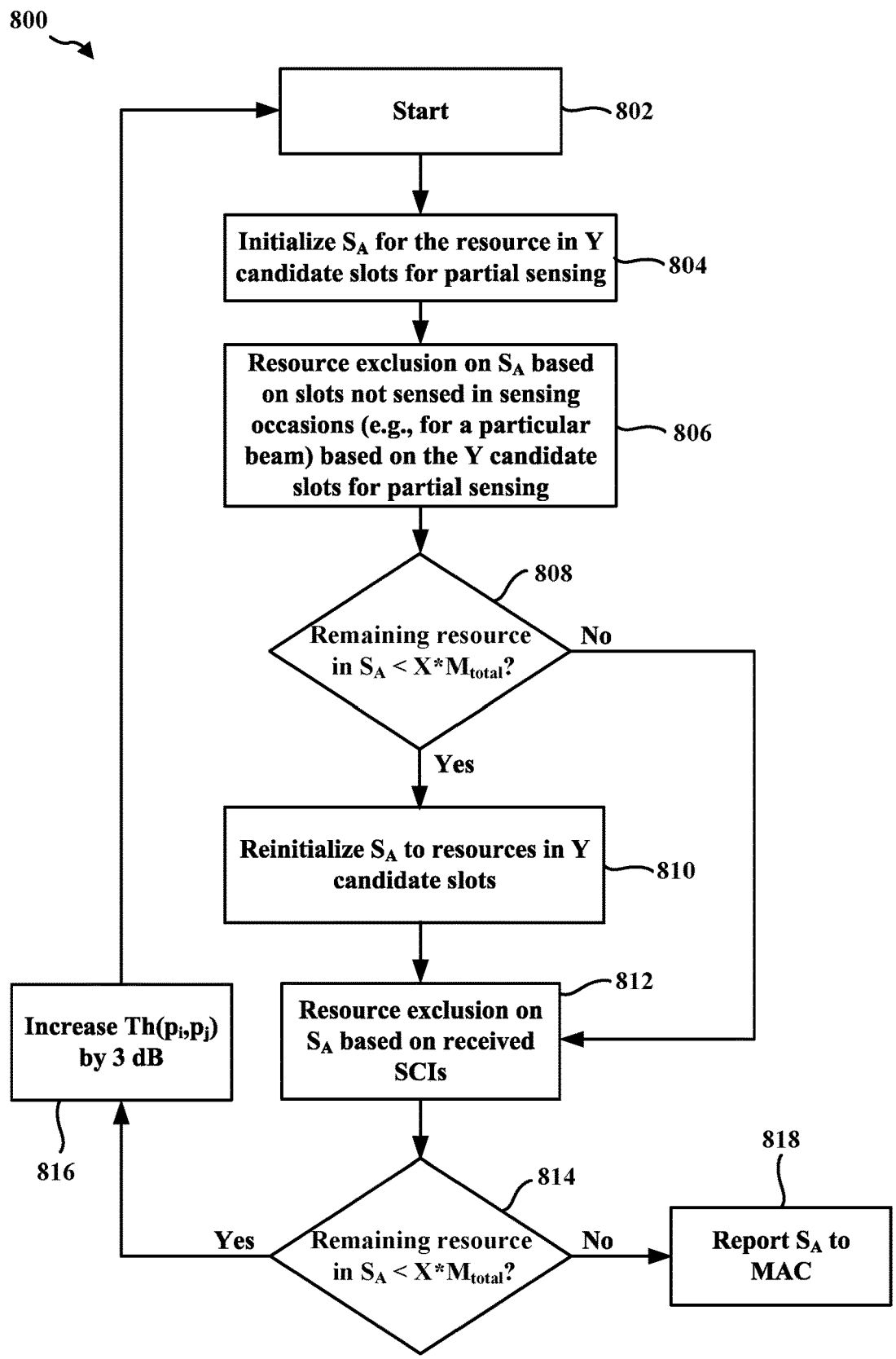
FIG. 8 is a flow diagram illustrating an available resource determination procedure performed at the PHY layer for partial sensing.

FIG. 8 is a flow diagram 800 illustrating an available resource determination procedure performed at the PHY layer for partial sensing. The PHY layer may perform a plurality of procedures for sensing the channel. After the MAC layer indicates the sensing parameters, the PHY layer may start a channel sensing procedure, at 802. The PHY layer may initialize, at 804, the set of available resources $S_A$ for the resources in the Y candidate slots for partial sensing. For example, the PHY layer may assume that the resources in the Y candidate slots are available resources upon initialization, at 804. The Y candidate slots may correspond to resources from which the MAC layer may select transmission resources of the UE.

The SW may include one or more time instances where a Tx UE may not be sensing the channel (e.g., partial sensing). For instance, the SW may include occasions where the Tx UE is not transmitting or receiving. The Tx UE may assume that another sidelink UE is transmitting an SCI on resources where the Tx UE is not sensing the channel. Future resources associated with resources where the Tx UE is not sensing the channel may be determined as unavailable resources for the Tx UE. Hence, resource exclusion may be performed, at 806, on the set of available resources $S_A$ based on slots that are not sensed in sensing occasions (e.g., for a particular beam) based on the Y candidate slots for partial sensing.

The set of available resources $S_A$ that the PHY layer reports to the MAC layer after the resource exclusion, at 806, may include a certain amount of remaining resources. At 808, the PHY layer may determine whether the remaining resources in the set of available resources $S_A < X^* M_{total}$. $M_{total}$ may correspond to the total number of $L_{subch}$ contiguous subchannels in the Y candidate slots. X may be based on $p_i = prio_{Tx}$ and may be indicated via sl-TxPercentageList. Example values for X may include 0.2, 0.35, and 0.5.

If after the resource exclusion, at 806, the amount of resources remaining in the set of available resources $S_A$ is less than $X^* M_{total}$, the set of available resources $S_A$ may be reinitialized, at 810, to the resources in the Y candidate slots. That is, the set of available resources may be adjusted so that the MAC layer has enough available resources for performing resource selection.

After re-initialization, at 810, resource exclusion may be performed, at 812, on the set of available resources $S_A$ based on received SCIs from other sidelink UEs. In examples where the remaining resources in the set of available resources $S_A$ are determined, at 808, to be greater than or equal to $X^* M_{total}$, the resource exclusion may be performed, at 812, without re-initialization, at 810, of the set of available resources $S_A$. The resources that are used by the other sidelink UEs may also be excluded from the set of available resources $S_A$ based on the RSRP threshold.

If the remaining resources in the set of available resources $S_A$ are determined, at 814, to be greater than or equal to $X^* M_{total}$, the PHY layer may generate the set of available resources $S_A$ and report, at 818, the set of available resources $S_A$ to the MAC layer. If after the resource exclusion, at 812, the number of resources remaining in the set of available resources $S_A$ is less than $X \cdot M_{total}$, $Th(p_i, p_j)$ may be increased, at 816, by 3 dB for each priority value Th($p_i$,$p_j$) and the available resource determination procedure may be restarted, at 802.

The resource pool may be of a first type that allows for periodic transmissions, where multiple TBs may be transmitted, or the resource pool may be of a second type that does not allow for periodic transmissions. If the resource pool does not allow for periodic transmissions, the Tx UE may not perform PBPS. For example, a parameter that enables/disables multiple TB transmissions in sidelink, such as the parameter sl-multiTBReserve, may be disabled. In cases where the resource pool does not allow for periodic transmissions, the Tx UE may not use PBPS for detecting the resource reservations of the other sidelink UEs that may be performing periodic transmissions. Otherwise, the Tx UE may perform both partial sensing techniques (e.g., PBPS and CPS) and may combine sensing results from both techniques to determine the set of available resources $S_A$.

Partial sensing techniques may be used for sidelink Mode 2 Tx resource pools, which may be configured/pre-configured to enable full sensing, partial sensing (e.g., PBPS and CPS), random resource selection, or a combination(s) thereof. PBPS may be used for detecting periodic resource reservations of the other sidelink UEs in the resource pools, which may include periodic resource reservations being enabled based on sl-multiTBReserve. CPS may be used for detecting aperiodic resource reservations of the other sidelink UEs in the resource pools, which may include periodic resource reservations being enabled/disabled. If the resource pools do not allow for periodic transmissions (e.g., sl-multiTBReserve is disabled), the Tx UE may not perform PBPS. Otherwise, the Tx UE may perform both partial sensing techniques (e.g., PBPS and CPS) and may combine sensing results from both techniques to determine the set of available resources $S_A$.

The RSW for full sensing may start at a time of a resource selection trigger and may end at a time of the resource selection trigger plus the PDB of the TB for which the UE is selecting resources. The PDB may be predetermined at the time of the resource selection trigger. If the Tx UE is unable to determine when resource selection may be triggered, the Tx UE may perform continuous/full sensing. For example, the PHY layer of the Tx UE may be unable to determine when the MAC layer of the Tx may indicate a transmission. Thus, the PHY layer may be prepared to report the set of available resources $S_A$ to the MAC layer as soon as the MAC layer indicates a transmission to the PHY layer.

Partial sensing techniques may allow the PHY layer of the UE to wait for the MAC layer of the UE to indicate the Y candidate slots to be used for transmission. The MAC layer may not determine the Y candidate slots until the MAC layer determines that the Tx UE may perform a transmission. The Tx UE may determine the Y candidate slots for partial sensing based on the PDB associated with the resource selection trigger. Sensing occasions may be based on a time gap between the resource selection trigger and a start of the Y candidate slots.

A CBR measurement, such as for a slot n, may correspond to a portion of sub-channels in the resource pool having a sidelink RSSI measured by the UE as exceeding a configured/pre-configured threshold. The threshold may be sensed over a CBR measurement window [n−a, n−1], where a may be equal to 100 or 100·$2^\mu$ slots based on a higher layer parameter, such as timeWindowSize-CBR. The CBR may be used for selecting a number of HARQ retransmissions, selecting $L_{subch}$ (e.g., the number of sub-channels to be used for a PSSCH/PSCCH transmission in a slot), selecting the MCS, and/or selecting a channel occupancy ratio (CR) limit. The number of HARQ retransmissions may be selected based on values included in a parameter for a maximum transmission number for PSSCH (e.g., which may be referred to as sl-MaxTxTransNumPSSCH), which may be configured in in a sidelink PSSCH transmission configuration (e.g., which may be referred to as sl-PSSCH-TxConfigList). If a CBR measurement is performed, the selected number of HARQ retransmissions may be within the sl-MaxTxTransNumPSSCH of the sidelink CBR priority transmission configuration (e.g., which may be referred to as sl-CBR-PriorityTxConfigList) corresponding to the Tx priority. The MCS may be selected between a minimum MCS for PSSCH (e.g., which may be referred to by a parameter such as sl-MinMCS-PSSCH) and a maximum MCS for PSSCH (e.g., which may be referred to by a parameter such as sl-MaxMCS-PSSCH) of the sl-PSSCH-TxConfigList. If a CBR measurement is performed, the selected MCS may be between the sl-MinMCS-PSSCH and the sl-MaxMCS-PSSCH of the sl-CBR-PriorityTxConfigList. While a CBR may correspond to a specific measurement of the channel activity, the UE may be configured to perform other techniques for selecting HARQ retransmission resources and/or the MCS based on the channel activity without performing a CBR measurement.

A sidelink CBR measurement may be performed based on partial sensing. For example, sidelink RSSI may be measured for slots that the UE performs partial sensing and PSCCH/PSSCH reception over a sidelink CBR measurement window. The CBR may be limited to slots for which the sidelink RSSI is measured. In a first example, if the number of sidelink RSSI measurement slots is below the configured/pre-configured threshold, a configured/pre-configured sidelink CBR value may be used for the CBR. In a second example, if the number of sidelink RSSI measurement slots is below the configured/pre-configured threshold, the UE may measure a set of additional slots within the sidelink CBR measurement window to satisfy the threshold. The set of additional slots may be selected/sensed at random for meeting the threshold. In a third example, if the number of sidelink RSSI measurement slots is below the configured/pre-configured threshold, the UE may measure an additional set of slots, which may extend outside the sidelink CBR measurement window to meet the threshold. Whether the additional set of slots is configured/pre-configured or selected by the UE may be based on UE implementation. In a fourth example, the UE may not perform a CBR measurement. For instance, in the absence of a sidelink CBR measurement, the UE may use a configured/pre-configured sidelink CBR value. Based on the first example and the fourth example, the number of HARQ transmissions and the MCS may be configured/pre-configured. The number of HARQ transmissions and the MCS may be indicative of the "busy-ness" of the channel. Hence, the UE may utilize parameters that are independent of a CBR measurement (e.g., pre-configured values) to determine the channel activity for HARQ/MCS selection.

Referring again to FIGS. 6-7, HARQ retransmission resources (e.g., 604a-604b/614a-614b) may be selected from the $S_A$ when the $S_A$ is generated based on partial sensing. For partial sensing, the $S_A$ may be generated based on the Y candidate slots 702/752. If the number of HARQ retransmissions is increased, there may be an increased number of Y candidate slots 702/752 (e.g., a large $S_A$ may be generated). Conversely, if the number of Y candidate slots 702/752 is increased, which may be associated with a larger $S_A$, the number of HARQ retransmissions may be increased.

If the number of Y candidate slots 702 is increased, a PBPS sensing load may be increased. Hence, PBPS sensing may be balanced with selection of HARQ retransmission resources (e.g., 604a-604b/614a-614b). A decreased number of Y candidate slots 702/752 may limit the UE to selecting fewer HARQ retransmission occasions, but may conserve energy at the UE based on reduced sensing. An increased number of Y candidate slots 702/752 may allow the UE to select more HARQ retransmission occasions, but may cause additional energy to be consumed at the UE based on increased sensing.

For PBPS, the number of Y candidate slots 702 may be based on the number of selected HARQ retransmissions. The UE may be configured with a table/function that indicates the number of Y candidate slots 702 based on the number of HARQ retransmissions. The number of Y candidate slots 702 may be a multiple of the number of HARQ retransmissions. In examples, the number of Y candidate slots 702 may be greater than a minimum number associated with the number of HARQ retransmissions. In further aspects for PBPS, the number of HARQ retransmissions may be based on the number of Y candidate slots 702. The table/function may be used to determine the number of HARQ retransmissions based on the number of Y candidate slots 702. In examples, the number of HARQ retransmissions may be less than a maximum number associated with the number of Y candidate slots 702. In still further aspects for PBPS, the number of Y candidate slots 702 and the number of HARQ retransmissions may not have a direct relationship (e.g., the UE may select one independently of the other). In yet further aspects for PBPS, the number of HARQ retransmissions may be equal to or less than a configured threshold. The configured threshold may correspond to a resource pool parameter associated with the Tx UE that uses PBPS to select Tx resources. The configured threshold may not be based on the number of Y candidate slots 702.

FIG. 9 is a call flow diagram 900 illustrating communications between a Tx UE 902, an Rx UE 904, other sidelink UE(s) 906, and a network 908. The network 908 may include a network entity, which may correspond to a base station or an entity at a base station, such as a CU, a DU, an RU, etc. At 910, the Tx UE 902 may receive a configuration from the network 908. In a first example, the configuration received, at 910, by the Tx UE 902 may be indicative of a table/function that the Tx UE 902 may use to determine a HARQ retransmission parameter and/or an MCS based on a number of Y candidate slots, a ratio between an amount of available resources and the number of Y candidate slots, etc. In a second example, the configuration received, at 910, by the Tx UE 902 may be indicative of an incremental increase value (e.g., 3 dB) to a threshold associated with a minimum amount of available resources.

At 912a, the Tx UE 902 may perform partial sensing to identify available resources for a sidelink transmissions to the Rx UE 904. The Tx UE 902 may receive, at 912b, and indication from the other sidelink UE(s) 906 of resources that are reserved by the other sidelink UE(s) 906, which may be unavailable to the Tx UE 902 for performing the sidelink transmission to the Rx UE 904. At 914, the PHY layer of the Tx UE 902 may provide to the MAC layer of the Tx UE 902 an indication of available resources for the sidelink transmission to the Rx UE 904 based on the partial sensing performed, at 912a. At 916, the MAC layer of the Tx UE 902 may select (e.g., without a CBR measurement/value) a HARQ retransmission parameter and/or the MCS for the sidelink transmission to the Rx UE 904 based on the available resources indicated, at 914, from the PHY layer of the Tx UE 902.

At 918, the Tx UE 902 may transmit the sidelink transmission to the Rx UE 904. The selection, at 916, and/or the transmission, at 918, may be based on at least one of: (1) a number of Y candidate slots associated with partial sensing; (2) an amount of available resources within the number of Y candidate slots associated with partial sensing; or (3) a number of times that a threshold for a minimum amount of the available resources is increased. Hence, the Tx UE 902 may transmit, at 918, the sidelink transmission to the Rx UE 904 based on at least three different techniques associated with an activity level (e.g., "busy-ness") of the channel without performing a CBR measurement.

A first technique for determining an activity level of the channel without performing a CBR measurement may include having the number of HARQ retransmissions be based on the number of Y candidate slots. The Tx UE 902 may determine a relationship between the number of Y candidate slots and certain transmission parameters of the sidelink transmission, at 918, to the Rx UE 904. For example, if the Tx UE 902 is to perform an increased number of HARQ retransmissions, the MAC layer of the Tx UE 902 may indicate an increased number of Y candidate slots to the PHY layer of the Tx UE 902, so that the PHY layer of the Tx UE 902 may provide a sufficient number of resources from which the MAC layer of the Tx UE 902 may select transmission opportunities. That is, if the Tx UE 902 has an increased number of HARQ retransmissions, the number of Y candidate slots may be increased, so an increased $S_A$ may be generated. If the MAC layer of the Tx UE 902 does not indicate an increased number of Y candidate slots to the PHY layer of the Tx UE 902, an increased number of HARQ retransmission opportunities may not fit within the indicated Y candidate slots. If the number of Y candidate slots is increased, which may be associated with a larger $S_A$, the number of HARQ retransmissions selected, at 916, by the MAC layer of the Tx UE may be increased.

The number of HARQ retransmissions may be based on the number of Y candidate slots, and the number of Y candidate slots may be based on the number of selected HARQ retransmissions. The table/function configured, at 910, to the Tx UE 902 may indicate the number of Y candidate slots based on the number of HARQ retransmissions. For example, the number of Y candidate slots may be a multiple of the number of HARQ retransmissions. In examples, the number of Y candidate slots may be greater than a minimum number associated with the number of HARQ retransmissions, or the number of HARQ retransmissions be less than a maximum number associated with the number of Y candidate slots.

A second technique for determining an activity level of the channel without performing a CBR measurement may include having the MCS and the HARQ be based on the amount of available resources corresponding to $S_A$ relative to the number of Y candidate slots. Transmission parameters, such as the number of HARQ retransmissions and the MCS that the Tx UE 902 selects, at 916, for the sidelink transmission, at 918, may be based on a ratio between the number of resources in $S_A$ and the number of resources in the Y candidate slots. The Y candidate slots may correspond to an input to a sensing algorithm of the PHY layer, and the $S_A$ may correspond to an output of the sensing algorithm of the PHY layer. If the MAC layer of the Tx UE 902 indicates an increased number of Y candidate slots for sensing by the Tx UE 902, but the Tx UE 902 is able to determine a reduced number of available resources in $S_A$, the channel may be busy, as the Tx UE 902 may not have been able to determine an increased number of available resources among the Y candidate slots. Thus, if the ratio is low, the channel may be busy. If the ratio is high, the channel may not be busy. The ratio may correspond to a qualitative measure of the channel, as an alternative to performing a CBR measurement that may otherwise indicate channel activity based on an associated number/value. The ratio may be used as a measure of the channel, and the parameters for the HARQ retransmission and the MCS may be based on the ratio. A busy channel may have a decreased amount of resources in $S_A$ compared to the amount of resources in the Y candidate slots (e.g., where an increased amount of resources in the Y candidate slots has been eliminated from $S_A$).

HARQ and/or MCS selection, at 916, may be based on an amount of resources in $S_A$ as a percentage of the Y candidate slots. The Y candidate slots may correspond to an input for a PHY layer available resource determination process. The $S_A$ may be initialized to the Y candidate slots, and based on one or more SCI received from one or more of the other sidelink UE(s) 906, resources may be eliminated from $S_A$. If the channel is busy (e.g., there is an increased amount of reservations by the other sidelink UE(s) 906), an increased percentage of the Y candidate slot resources may be eliminated from $S_A$. Thus, the amount of available resources that are reported to the MAC layer (e.g., at 914) as a percentage of the Y candidate slot resources may be decreased. Accordingly, the number of HARQ retransmissions and/or the MCS selected, at 916, at the MAC layer may be based on the amount of resources in the $S_A$ as a percentage of the Y candidate slot resources. The Tx UE 902 may be configured, at 910, with a table/function that indicates the HARQ/MCS based on the percentage of the Y candidate slots. The number of HARQ retransmissions and/or the MCS may be less than a maximum number based on the percentage of Y candidate slots.

A third technique for determining an activity level of the channel without performing a CBR measurement may include having the MCS and the HARQ be based on a number of times that the PHY layer increases the threshold $Th(p_i,p_j)$ to generate the $S_A$. A busy channel may correspond to the PHY layer increasing the threshold $Th(p_i,p_j)$ (e.g., RSRP threshold) on an increased number of occasions to generate the $S_A$, where the $S_A$ satisfies $X \times M_{total}$. Thus, HARQ/MCS selection, at 916, may be based on a number of adjustments to the threshold. If the channel is busy, the Tx UE 902 may increase the threshold $Th(p_i,p_j)$ multiple times for $S_A \geq X \cdot M_{total}$. The channel may be regarded as busy if there are an increased number of potential sources of interference. The number of times that the Tx UE 902 increases the threshold $Th(p_i,p_j)$ may be indicative of the activity level of the channel. That is, HARQ/MCS selection, at 916, may be based on the number of times the threshold was increased, where the threshold may be increased multiple times for a busy channel or a reduced number of times/not at all for a non-busy channel.

Referring again to FIG. 8, the flow diagram 800 may correspond to an algorithm executed at the PHY layer. The $S_A$ may be compared, at 808/814, to a percentage of the total sub-channels in the RSW (e.g., $S_A \geq X \cdot M_{total}$) The comparison, at 808/814, may be performed after resource exclusion/elimination, at 806/812. In a first pass of the algorithm (e.g., flow diagram 800) executed at the PHY layer, if the UE has to exclude/eliminate an increased number of resources in the RSW because the channel is busy, the $S_A$ may not satisfy the percentage associated with $S_A \geq X \cdot M_{total}$. Thus, the UE may increase, at 816, the RSRP threshold by a certain increment. For example, the RSRP threshold may be incremented by 3 dB. A size of the incremental increase (e.g., 3 dB) to the RSRP threshold, at 816, may be configured by the network in some examples.

If after a second pass of the algorithm (e.g., flow diagram 800) executed at the PHY layer, the $S_A$ again does not satisfy the percentage associated with $S_A \geq X \cdot M_{total}$, the RSRP threshold may be again increased, at 816, for a second time based on a second incremental amount (e.g., another 3 dB increment or a different size increment). If the channel is busy, the UE may increase the RSRP threshold, at 816, multiple times. If the channel is not busy, the UE may not increase the RSRP threshold at all, at 816, or the RSRP threshold may be increased, at 816, a few number of times. The UE may count the number of times that the RSRP threshold is increased, at 816, where a greater number of threshold increase occasions may correspond to a busier channel. If the channel is busy, the UE may select the HARQ/MCS more conservatively. If the number of times the RSRP threshold is increased, at 816, corresponds to a low number of times, the UE may select the HARQ/MCS more generously. Thus, the number of threshold increase occasions may allow the UE to associate the HARQ/MCS with an indirect measure of the channel activity without performing a CBR measurement.

Figure 10:
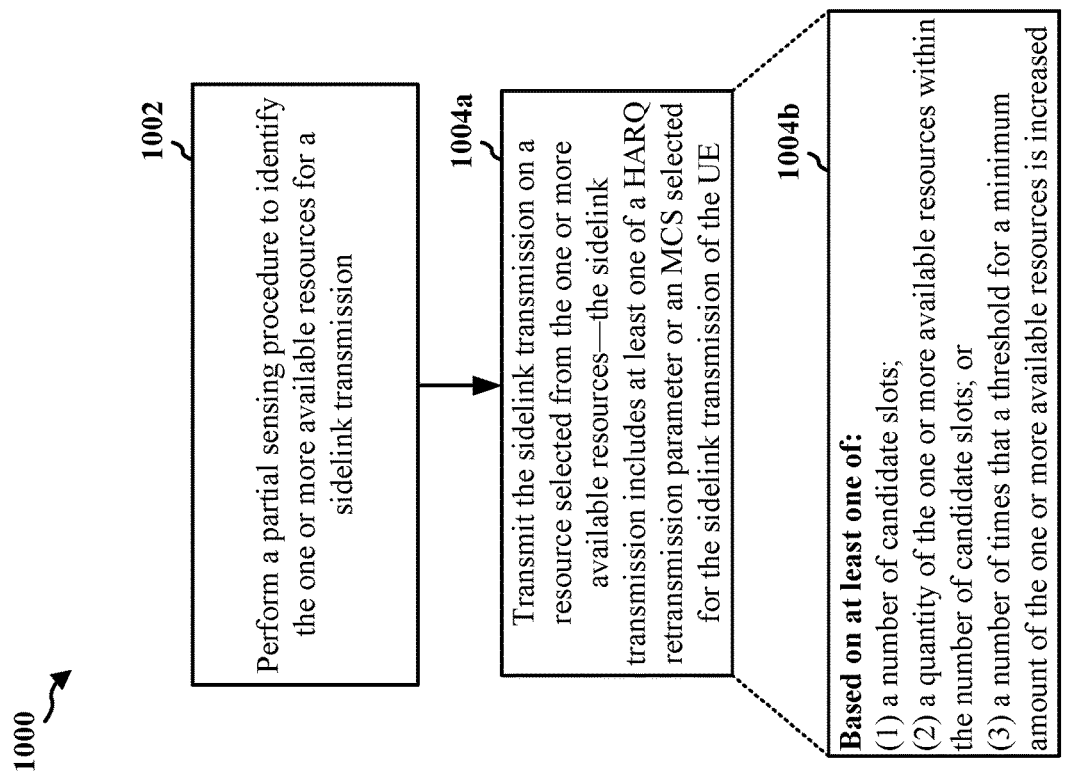
FIG. 10 is a flowchart of a method of wireless communication at a UE.

FIG. 10 is a flowchart 1000 of a method of wireless communication. The method may be performed by a UE (e.g., the UE 104, 422, 902; the device 350; the apparatus 1204, etc.), which may include the memory 360 and which may correspond to the entire UE 104, 422, 902, device 350; or apparatus 1204, or a component of the UE 104, 422, 902; device 350; or the apparatus 1204, such as the TX processor 368, the RX processor 356, the controller/processor 359, the cellular baseband processor 1224, and/or the application processor 1206. The method may be performed to select HARQ/MCS and/or determine an activity level of a channel without a CBR measurement.

At 1002, the UE may perform a partial sensing procedure to identify the one or more available resources for a sidelink transmission of the UE. For example, referring to FIG. 9, the Tx UE 902 may perform, at 912*a*, a partial sensing procedure to identify transmission resources used by other sidelink UE(s) 906 to transmit, at 912*b*, one or more sidelink transmissions. The performance, at 1002, may be based on the partial sensing component 198 of the apparatus 1204 in FIG. 12.

At 1004*a*, the UE may transmit the sidelink transmission on a resource selected from the one or more available resources—the sidelink transmission includes at least one of a HARQ retransmission parameter or an MCS selected for the sidelink transmission. For example, referring to FIG. 9, the Tx UE 902 may transmit, at 918, the sidelink transmission to the Rx UE 904 on the available resources indicated, at 914, from the PHY to the MAC. The sidelink transmission, at 918, may be associated with the HARQ retransmission parameter and/or the MCS selected, at 916, by the MAC of the Tx UE 902. The transmission, at 1004*a*, may be based on the partial sensing component 198 of the apparatus 1204 in FIG. 12.

At 1004*b*, the selection may be based on at least one of: (1) a number of candidate slots (e.g., a number of candidate slots for a partial sensing procedure); (2) an amount of the one or more available resources within the number of candidate slots; or (3) a number of times that a threshold for a minimum amount of the one or more available resources is increased. For example, referring to FIG. 9, the selection, at 916, and the transmission, at 918, by the Tx UE 902 may be based on at least one of: (1) a number of candidate slots; (2) a quantity, e.g., an amount, of available resources within the number of candidate slots; or (3) a number of times that a threshold for a minimum amount of the available resources is increased. The selection, at 1112*b*, may be based on the partial sensing component 198 of the apparatus 1204 in FIG. 12.

Figure 11:
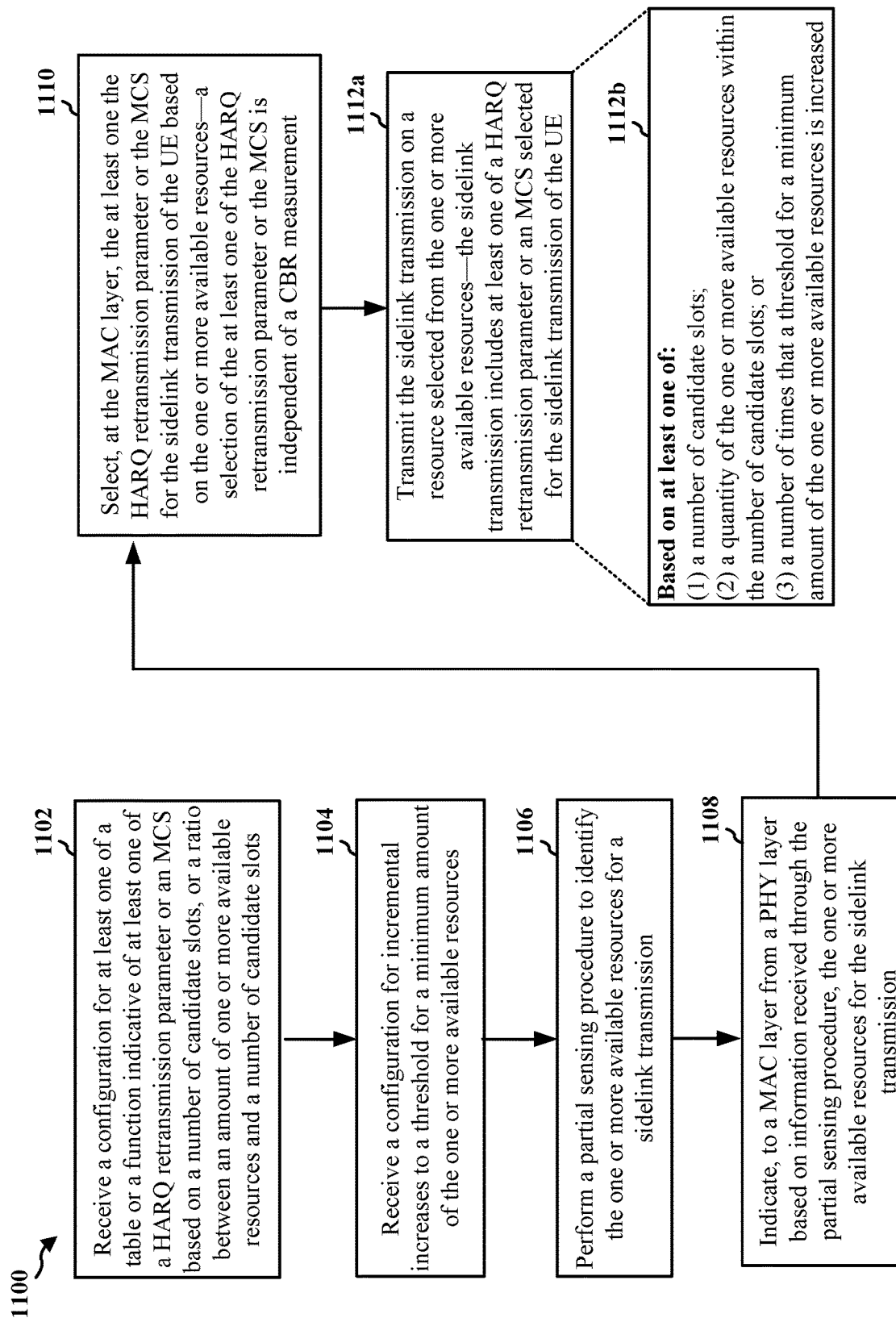
FIG. 11 is a flowchart of a method of wireless communication at a UE.

FIG. 11 is a flowchart 1100 of a method of wireless communication. The method may be performed by a UE (e.g., the UE 104, 422, 902; the device 350; the apparatus 1204, etc.), which may include the memory 360 and which may correspond to the entire UE 104, 422, 902; the device 350; or apparatus 1204, or a component of the UE 104, 422, 902; the device 350; or the apparatus 1204, such as the TX processor 368, the RX processor 356, the controller/processor 359, the cellular baseband processor 1224, and/or the application processor 1206. The method may be performed to select HARQ/MCS and/or determine an activity level of a channel without a CBR measurement.

At 1102, the UE may receive a configuration for a relationship between one or more of: the at least one of the HARQ retransmission parameter based on the number of the candidate slots, the MCS based on the number of the candidate slots, or a ratio between the amount of the one or more available resources and the number of candidate slots. The UE may receive a configuration for at least one of a table or a function indicative of at least one of a HARQ retransmission parameter or an MCS based on a number of candidate slots, or a ratio between an amount of one or more available resources and a number of candidate slots. For example, referring to FIG. 9, the Tx UE 902 may receive, at 910, a configuration from the network 908. The configuration may configure the Tx UE 902 with a table/function, which may be used, at 916, by the Tx UE 902 for selection of the HARQ retransmission parameter or the MCS. The HARQ retransmission parameter associated with the sidelink transmission, at 918, from the Tx UE 902 to the Rx UE 904 may be indicative of a number of candidate slots, an amount of available resources within the number of candidate slots, etc. The reception, at 1102, may be based on the partial sensing component 198 of the apparatus 1204 in FIG. 12. The HARQ retransmission parameter may correspond to a number of HARQ retransmissions. In some aspects, at least one of the HARQ retransmission parameter or the MCS may be independent of a CBR.

The HARQ retransmission parameter may be increased or a more robust MCS (e.g., a lower or reduced MCS that may improve performance) is used based on the ratio between the amount of the one or more available resources, the number of candidate slots corresponding to a first ratio that is lower than a second ratio, the first ratio associated with a busier channel than the second ratio. A busier channel may correspond to a channel that experiences more wireless traffic, e.g., which may be referred to as a busier channel, a more occupied channel, a channel with a higher CBR measurement, or some other way that indicates that more wireless transmissions occur on the resources of the channel than on another channel. For example, the HARQ retransmission parameter may be increased or a reduced MCS may be used based on the ratio between the amount of the one or more available resources being less than a ratio threshold.

At 1104, the UE may receive a configuration for incremental increases to a threshold for a minimum amount of the one or more available resources. For example, referring to FIG. 9, the Tx UE 902 may receive, at 910, a configuration from the network 908. The configuration may configure the Tx UE 902 based on a threshold, which may be used, at 916, by the Tx UE 902 for selection of the HARQ retransmission parameter or the MCS. The HARQ retransmission parameter associated with the sidelink transmission, at 918, from the Tx UE 902 to the Rx UE 904 may be indicative of a number of times that a threshold for a minimum amount of the available resources is increased. The reception, at 1104, may be based on the partial sensing component 198 of the apparatus 1204 in FIG. 12.

At 1106, the UE may perform a partial sensing procedure to identify the one or more available resources for a sidelink transmission. For example, referring to FIG. 9, the Tx UE 902 may perform, at 912*a*, a partial sensing procedure to identify transmission resources used by other sidelink UE(s) 906 to transmit, at 912*b*, one or more sidelink transmissions. The performance, at 1106, may be based on the partial sensing component 198 of the apparatus 1204 in FIG. 12.

At 1108, the UE may indicate, to a MAC layer from a PHY layer based on information received through the partial sensing procedure, the one or more available resources for the sidelink transmission of the UE. For example, referring to FIG. 9, the Tx UE 902 may indicate, at 914, a PHY to MAC indication of available resources for transmitting, at 918, a sidelink transmission to the Rx UE 904. The PHY to MAC indication, at 914, may be based on the partial sensing procedure performed, at 912*a*, by the Tx UE 902. The indication, at 1108, may be based on the partial sensing component 198 of the apparatus 1204 in FIG. 12.

At 1110, the UE may select, at the MAC layer, the at least one the HARQ retransmission parameter or the MCS for the sidelink transmission of the UE based on the one or more available resources—a selection of the at least one of the HARQ retransmission parameter or the MCS is independent of a CBR measurement. For example, referring to FIG. 9, the Tx UE 902 may perform, at 916, a selection, at the MAC, of the HARQ retransmission parameters and/or the MCS for the sidelink transmission that is transmitted, at 918, to the Rx UE 904. The selection, at 916, by the Tx UE 902 may be performed without CBR information. The selection, at 1110, may be based on the partial sensing component 198 of the apparatus 1204 in FIG. 12.

At 1112*a*, the UE may transmit the sidelink transmission on a resource selected from the one or more available resources—the sidelink transmission includes at least one of a HARQ retransmission parameter or an MCS selected for the sidelink transmission of the UE. For example, referring to FIG. 9, the Tx UE 902 may transmit, at 918, the sidelink transmission to the Rx UE 904 on the available resources indicated, at 914, from the PHY to the MAC. The sidelink transmission, at 918, may be associated with the HARQ retransmission parameter and/or the MCS selected, at 916, by the MAC of the Tx UE 902. The transmission, at 1112*a*, may be based on the partial sensing component 198 of the apparatus 1204 in FIG. 12.

At 1112*b*, the selection may be based on at least one of: (1) a number of candidate slots; (2) a quantity of the one or more available resources within the number of candidate slots (e.g., a number of candidate slots for a partial sensing procedure); or (3) a number of times that a threshold for a minimum amount of the one or more available resources is increased. For example, referring to FIG. 9, the selection, at 916, and the transmission, at 918, by the Tx UE 902 may be based on at least one of: (1) a number of candidate slots; (2) quantity of available resources within the number of candidate slots; or (3) a number of times that a threshold for a minimum amount of the available resources is increased.

Figure 12:
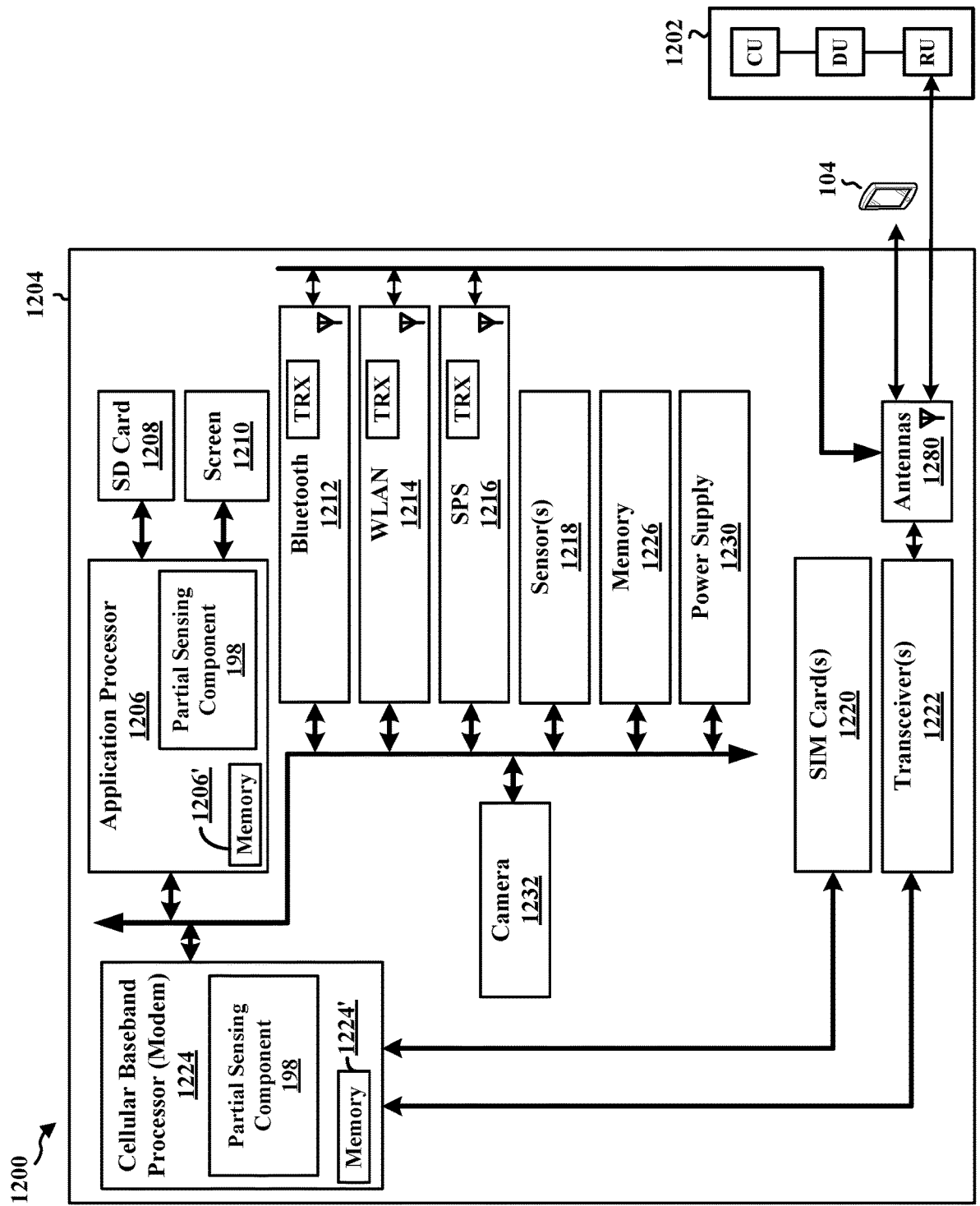
FIG. 12 is a diagram illustrating an example of a hardware implementation for an example apparatus and/or network entity.

The selection, at 1112*b*, may be based on the partial sensing component 198 of the apparatus 1204 in FIG. 12.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional modules of memory 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the device 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see the device 350 of FIG. 3) and include the additional modules of the apparatus 1204.

As discussed supra, the partial sensing component 198 is configured to perform a partial sensing procedure to identify one or more available resources for a sidelink transmission of the UE; and transmit the sidelink transmission on a resource selected from the one or more available resources, the sidelink transmission including at least one of a HARQ retransmission parameter or an MCS selected for the sidelink transmission of the UE based on at least one of: a number of candidate slots, an amount of the one or more available resources within the number of candidate slots, or a number of times that a threshold for a minimum amount of the one or more available resources is increased. The partial sensing component 198 may be further configured to perform any of the aspects described in connection with the flowchart in FIG. 10 or 11, or the aspects performed by the UE 902 in FIG. 9. The partial sensing component 198 may be within the cellular baseband processor 1224, the application processor 1206, or both the cellular baseband processor 1224 and the application processor 1206. The partial sensing component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1204 may include a variety of components configured for various functions. In one configuration, the apparatus 1204, and in particular the cellular baseband processor 1224 and/or the application processor 1206, includes means for performing a partial sensing procedure to identify one or more available resources for a sidelink transmission of the UE; and means for transmitting the sidelink transmission on a resource selected from the one or more available resources, the sidelink transmission including at least one of a HARQ retransmission parameter or an MCS selected for the sidelink transmission of the UE based on at least one of: a number of candidate slots, an amount of the one or more available resources within the number of candidate slots, or a number of times that a threshold for a minimum amount of the one or more available resources is increased. The apparatus 1204 further includes means for receiving a configuration for at least one of a table or a function indicative of the at least one of the HARQ retransmission parameter or the MCS based on the number of the candidate slots, or a ratio between the amount of the one or more available resources and the number of candidate slots. The apparatus 1204 further includes means for receiving a configuration for incremental increases to the threshold for the minimum amount of the one or more available resources. The apparatus 1204 further includes means for indicating, to a MAC layer from a PHY layer based on information received through the partial sensing procedure, the one or more available resources for the sidelink transmission of the UE; and means for selecting, at the MAC layer, the at least one the HARQ retransmission parameter or the MCS for the sidelink transmission of the UE based on the one or more available resources, a selection of the at least one of the HARQ or the MCS being independent of a CBR measurement. The means may be the partial sensing component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets may be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. Structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" may not be construed as a reference to a closed set of information, one or more conditions, one or more factors, or the like. In other words, the phrase "based on A" (where "A" may be information, a condition, a factor, or the like) may be construed as "based at least on A" unless specifically recited differently.

The following aspects are illustrative only and may be combined with other aspects or teachings described herein, without limitation.

Aspect 1 is a method of wireless communication at a UE, including: performing a partial sensing procedure to identify one or more available resources for a sidelink transmission of the UE; and transmitting the sidelink transmission on a resource selected from the one or more available resources, the sidelink transmission including at least one of a HARQ retransmission parameter or an MCS selected for the sidelink transmission based on at least one of: a number of candidate slots, a quantity of the one or more available resources within the number of candidate slots for the partial sensing procedure, or a number of times that a threshold for a minimum amount of the one or more available resources is increased.

Aspect 2 may be combined with aspect 1 and includes that the HARQ retransmission parameter corresponds to a number of HARQ retransmissions.

Aspect 3 may be combined with any of aspects 1-2 and includes that a first adjustment to the number of candidate slots including the one or more available resources corresponds to a second adjustment to the number of HARQ retransmissions.

Aspect 4 may be combined with any of aspects 1-3 and includes that the number of candidate slots indicated from a MAC layer to a PHY layer is based on the number of HARQ retransmissions, the number of candidate slots including the one or more available resources.

Aspect 5 may be combined with any of aspects 1-4 and includes that the at least one of the HARQ retransmission parameter or the MCS is based on a ratio between the amount of the one or more available resources and the number of candidate slots.

Aspect 6 may be combined with any of aspects 1-5 and includes that the HARQ retransmission parameter is increased or a reduced MCS, e.g., a more robust MCS, is used based on the ratio between the quantity of the one or more available resources and the number of candidate slots being less than a ratio threshold.

Aspect 7 may be combined with any of aspects 1-6 and further includes receiving a configuration for at least one of a table or a function indicative of the at least one of the HARQ retransmission parameter or the MCS based on the number of the candidate slots, or a ratio between the amount of the one or more available resources and the number of candidate slots.

Aspect 8 may be combined with any of aspects 1-7 and includes that the at least one of the HARQ retransmission parameter or the MCS is based on the number of times that the threshold for the minimum amount of the one or more available resources is increased.

Aspect 9 may be combined with any of aspects 1-8 and includes that the HARQ retransmission parameter is increased or a reduced MCS is used based on the threshold being increased at a first occasion and at a second occasion that is after the first occasion, the second occasion associated with a more occupied channel than the first occasion.

Aspect 10 may be combined with any of aspects 1-9 and further includes receiving a configuration for incremental increases to the threshold for the minimum amount of the one or more available resources.

Aspect 11 may be combined with any of aspects 1-10 and includes that the at least one of the HARQ retransmission parameter or the MCS is independent of a CBR.

Aspect 12 may be combined with any of aspects 1-11 and further includes indicating, to a MAC layer from a PHY layer based on information received through the partial sensing procedure, the one or more available resources for the sidelink transmission; and selecting, at the MAC layer, the at least one the HARQ retransmission parameter or the MCS for the sidelink transmission based on the one or more available resources, a selection of the at least one of the HARQ retransmission parameter or the MCS being independent of a CBR measurement.

Aspect 13 is an apparatus for wireless communication including memory and at least one processor coupled to the memory and configured to implement a method as in any of aspects 1-12.

Aspect 14 is an apparatus for wireless communication including means for implementing a method as in any of aspects 1-12.

In aspect 15, the apparatus of aspect 13 or aspect 14 further includes at least one antenna.

In aspect 16 the apparatus of aspect 13 or aspect 14 further includes at least one transceiver.

Aspect 17 is a non-transitory computer-readable storage medium storing computer executable code, the code when executed by at least one processor causes the at least one processor to implement a method as in any of aspects 1-12.

What is claimed is:

1. An apparatus for wireless communication at a user equipment (UE), comprising:
    memory; and
    one or more processors coupled to the memory and configured to cause the UE to:
        perform a partial sensing procedure associated with a number of candidate slots to identify one or more available resources in the number of candidate slots for a sidelink transmission of the UE; and
        transmit the sidelink transmission on a resource selected from the one or more available resources, the sidelink transmission associated with at least one of a hybrid automatic repeat request (HARQ) retransmission parameter or a modulation and coding scheme (MCS) selected for the sidelink transmission based on at least one of:
            a ratio between a quantity of the one or more available resources within the number of candidate slots and a number of resources in the number of candidate slots that is less than a threshold ratio, or
            a number of times that a minimum received power threshold for identification of resources in the number of candidate slots as unavailable has been increased based on a threshold for a minimum amount of the one or more available resources.

2. The apparatus of claim 1, wherein the HARQ retransmission parameter corresponds to a number of HARQ retransmissions.

3. The apparatus of claim 2, wherein the number of candidate slots indicated from a medium access control (MAC) layer to a physical (PHY) layer is based on the number of HARQ retransmissions, and wherein the number of candidate slots includes the one or more available resources.

4. The apparatus of claim 1, wherein the HARQ retransmission parameter is adjusted or a reduced MCS is used based on the ratio between the quantity of the one or more available resources and the number of resources in the number of candidate slots that is less than the threshold ratio.

5. The apparatus of claim 1, wherein the one or more processors are further configured to cause the UE to receive a configuration for a relationship between the at least one of the HARQ retransmission parameter or the MCS and one or more of:
    the ratio between the quantity of the one or more available resources and the number of resources in the number of candidate slots, or
    the number of times that the minimum received power threshold for identification of the resources in the number of candidate slots as unavailable has been increased based on the threshold for the minimum amount of the one or more available resources.

6. The apparatus of claim 1, wherein the at least one of the HARQ retransmission parameter or the MCS is based on the number of times that the minimum received power threshold for identification of the resources in the number of candidate slots as unavailable has been increased based on the threshold for the minimum amount of the one or more available resources.

7. The apparatus of claim 6, wherein the HARQ retransmission parameter is adjusted or a reduced MCS is used based on the threshold that is increased at a first occasion.

8. The apparatus of claim 6, wherein the one or more processors are further configured to cause the UE to receive a configuration for incremental increases to the minimum received power threshold.

9. The apparatus of claim 1, further comprising at least one of a transceiver or an antenna coupled to the one or more processors, wherein the at least one of the HARQ retransmission parameter or the MCS is independent of a channel busy ratio (CBR).

10. The apparatus of claim 1, wherein the one or more processors are further configured to cause the UE to:
    indicate, to a medium access control (MAC) layer from a physical (PHY) layer based on information received through the partial sensing procedure, the one or more available resources for the sidelink transmission; and
    select, at the MAC layer, the at least one of the HARQ retransmission parameter or the MCS for the sidelink transmission based on the one or more available resources.

11. A method of wireless communication at a user equipment (UE), comprising:
    performing a partial sensing procedure associated with a number of candidate slots to identify one or more available resources in the number of candidate slots for a sidelink transmission of the UE; and
    transmitting the sidelink transmission on a resource selected from the one or more available resources, the sidelink transmission associated with at least one of a hybrid automatic repeat request (HARQ) retransmission parameter or a modulation and coding scheme (MCS) selected for the sidelink transmission based on at least one of:
        a ratio between a quantity of the one or more available resources within the number of candidate slots and a number of resources in the number of candidate slots that is less than a threshold ratio, or
        a number of times that a minimum received power threshold for identifying resources in the number of candidate slots as unavailable has been increased based on a threshold for a minimum amount of the one or more available resources.

12. The method of claim 11, wherein the HARQ retransmission parameter corresponds to a number of HARQ retransmissions.

13. The method of claim 12, wherein the number of candidate slots indicated from a medium access control (MAC) layer to a physical (PHY) layer is based on the number of HARQ retransmissions, and wherein the number of candidate slots includes the one or more available resources.

14. The method of claim 11, wherein the HARQ retransmission parameter is reduced adjusted or a reduced MCS is used based on the ratio between the quantity of the one or more available resources and the number of resources in the number of candidate slots that is less than the threshold ratio.

15. The method of claim 11, further comprising receiving a configuration for at least one of a table or a function indicative of the at least one of the HARQ retransmission parameter or the MCS based on the ratio between the quantity of the one or more available resources and the number of resources in the number of candidate slots, or the number of times that the minimum received power threshold for identifying the resources in the number of candidate slots as unavailable has been increased based on the threshold for the minimum amount of the one or more available resources.

16. The method of claim 11, wherein the at least one of the HARQ retransmission parameter or the MCS is based on the number of times that the minimum received power threshold for identifying the resources in the number of candidate slots as unavailable has been increased based on the threshold for the minimum amount of the one or more available resources.

17. The method of claim 16, wherein the HARQ retransmission parameter is adjusted or a reduced MCS is used based on the threshold that is increased at a first occasion.

18. The method of claim 16, further comprising receiving a configuration for incremental increases to the minimum received power threshold.

19. The method of claim 11, wherein the at least one of the HARQ retransmission parameter or the MCS is independent of a channel busy ratio (CBR).

20. The method of claim 11, further comprising:
indicating, to a medium access control (MAC) layer from a physical (PHY) layer based on information received through the partial sensing procedure, the one or more available resources for the sidelink transmission; and
selecting, at the MAC layer, the at least one of the HARQ retransmission parameter or the MCS for the sidelink transmission based on the one or more available resources.

21. The method of claim 11, wherein the HARQ retransmission parameter is selected based on the ratio between the quantity of the one or more available resources within the number of candidate slots and the number of resources in the number of candidate slots that is less than the threshold ratio.

22. The method of claim 11, wherein the HARQ retransmission parameter is selected based on the number of times that the minimum received power threshold for identifying the resources in the number of candidate slots as unavailable has been increased based on the threshold for the minimum amount of the one or more available resources.

23. The method of claim 11, wherein the MCS is selected based on the ratio between the quantity of the one or more available resources within the number of candidate slots and the number of resources in the number of candidate slots that is less than the threshold ratio.

24. The method of claim 11, wherein the MCS is selected based on the number of times that the minimum received power threshold for identifying the resources in the number of candidate slots as unavailable has been increased based on the threshold for the minimum amount of the one or more available resources.

25. An apparatus for wireless communication at a user equipment (UE), comprising:
means for performing a partial sensing procedure associated with a number of candidate slots to identify one or more available resources in the number of candidate slots for a sidelink transmission of the UE; and
means for transmitting the sidelink transmission on a resource selected from the one or more available resources, the sidelink transmission associated with at least one of a hybrid automatic repeat request (HARQ) retransmission parameter or a modulation and coding scheme (MCS) selected for the sidelink transmission based on at least one of:
a ratio between a quantity of the one or more available resources within the number of candidate slots and a number of resources in the number of candidate slots that is less than a threshold ratio, or
a number of times that a minimum received power threshold for identifying resources in the number of candidate slots as unavailable has been increased based on a threshold for a minimum amount of the one or more available resources.

26. The apparatus of claim 25, wherein the HARQ retransmission parameter corresponds to a number of HARQ retransmissions.

27. The apparatus of claim 25, wherein the at least one of the HARQ retransmission parameter or the MCS is based on the number of times that the minimum received power threshold for identifying the resources in the number of candidate slots as unavailable has been increased based on the threshold for the minimum amount of the one or more available resources.

28. The apparatus of claim 25, further comprising:
means for indicating, to a medium access control (MAC) layer from a physical (PHY) layer based on information received through the partial sensing procedure, the one or more available resources for the sidelink transmission; and
means for selecting, at the MAC layer, the at least one of the HARQ retransmission parameter or the MCS for the sidelink transmission based on the one or more available resources, wherein a selection of the at least one of the HARQ retransmission parameter or the MCS is independent of a channel busy ratio (CBR) measurement.

29. A non-transitory computer-readable storage medium storing computer executable code, the code when executed by one or more processors coupled to a memory causes the one or more processors to:
perform a partial sensing procedure associated with a number of candidate slots to identify one or more available resources in the number of candidate slots for a sidelink transmission of a user equipment (UE); and
transmit the sidelink transmission on a resource selected from the one or more available resources, the sidelink transmission associated with at least one of a hybrid automatic repeat request (HARQ) retransmission parameter or a modulation and coding scheme (MCS) selected for the sidelink transmission based on at least one of:
a ratio between a quantity of the one or more available resources within the number of candidate slots and a number of resources in the number of candidate slots that is less than a threshold ratio, or
a number of times that a minimum received power threshold for identification of resources in the number of candidate slots as unavailable has been increased based on a threshold for a minimum amount of the one or more available resources.

* * * * *